United States Patent
Goyal et al.

(10) Patent No.: US 9,823,895 B2
(45) Date of Patent: Nov. 21, 2017

(54) MEMORY MANAGEMENT FOR FINITE AUTOMATA PROCESSING

(71) Applicant: Cavium, Inc., San Jose, CA (US)

(72) Inventors: Rajan Goyal, Saratoga, CA (US); Satyanarayana Lakshmipathi Billa, Sunnyvale, CA (US); Yossef Shanava, Sunnyvale, CA (US); Timothy Toshio Nakada, Santa Clara, CA (US); Abhishek Dikshit, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 594 days.

(21) Appl. No.: 14/252,354

(22) Filed: Apr. 14, 2014

(65) Prior Publication Data

US 2015/0067200 A1 Mar. 5, 2015

Related U.S. Application Data

(60) Provisional application No. 61/872,612, filed on Aug. 30, 2013, provisional application No. 61/872,622, filed on Aug. 30, 2013.

(51) Int. Cl.
*G06F 5/14* (2006.01)
*G06F 13/28* (2006.01)
(Continued)

(52) U.S. Cl.
CPC ............. *G06F 5/14* (2013.01); *G06F 9/3885* (2013.01); *G06F 13/28* (2013.01);
(Continued)

(58) Field of Classification Search
CPC ............. G06F 13/28; G06F 17/30985; G06F 2205/126; G06F 2213/2806;
(Continued)

(56) References Cited

U.S. PATENT DOCUMENTS

| | | |
|---|---|---|
| 5,428,554 A | 6/1995 | Laskoski |
| 5,608,662 A | 3/1997 | Large et al. |

(Continued)

FOREIGN PATENT DOCUMENTS

| | | |
|---|---|---|
| CN | 1716958 A | 1/2006 |
| CN | 101201836 A | 6/2008 |

(Continued)

OTHER PUBLICATIONS

Hayes, C.L., et al., "DPICO: A High Speed Deep Packet Inspection Engine Using Compact Finite Automata," ANCS'07 pp. 195-203 (2007).

(Continued)

*Primary Examiner* — Henry Tsai
*Assistant Examiner* — John Roche
(74) *Attorney, Agent, or Firm* — Hamilton, Brook, Smith & Reynolds, P.C.

(57) ABSTRACT

Matching at least one regular expression pattern in an input stream may be optimized by initializing a search context in a run stack based on (i) partial match results determined from walking segments of a payload of a flow through a first finite automation and (ii) a historical search context associated with the flow. The search context may be modified via push or pop operations to direct at least one processor to walk segments of the payload through the at least one second finite automation. The search context may be maintained in a manner that obviates overflow of the search context and obviating stalling of the push or pop operations to increase match performance.

39 Claims, 25 Drawing Sheets

(51) Int. Cl.
  *G06F 21/56*   (2013.01)
  *G06F 9/38*    (2006.01)
  *H04L 12/24*   (2006.01)
  *H04L 29/06*   (2006.01)
  *G06F 17/30*   (2006.01)

(52) U.S. Cl.
  CPC ...... *G06F 17/30985* (2013.01); *G06F 21/567* (2013.01); *H04L 41/28* (2013.01); *H04L 63/1408* (2013.01); *G06F 2205/126* (2013.01); *G06F 2213/2806* (2013.01)

(58) Field of Classification Search
  CPC . G06F 17/30864; G06F 21/564; H04L 41/28; H04L 63/1408
  See application file for complete search history.

(56) References Cited

U.S. PATENT DOCUMENTS

| | | | |
|---|---|---|---|
| 5,893,142 | A | 4/1999 | Moyer et al. |
| 6,314,513 | B1 | 11/2001 | Ross et al. |
| 6,954,424 | B2 | 10/2005 | Barrack et al. |
| 7,046,848 | B1 | 5/2006 | Olcott |
| 7,225,188 | B1 | 5/2007 | Gai et al. |
| 7,260,558 | B1 | 8/2007 | Cheng et al. |
| 7,308,446 | B1 | 12/2007 | Panagrahy et al. |
| 7,460,473 | B1 | 12/2008 | Kodama et al. |
| 7,594,081 | B2 | 9/2009 | Bouchard et al. |
| 7,702,629 | B2 | 4/2010 | Cytron et al. |
| 7,710,988 | B1 | 5/2010 | Tripathi et al. |
| 7,805,392 | B1 | 9/2010 | Steele et al. |
| 7,870,161 | B2 | 1/2011 | Wang |
| 7,944,920 | B2 | 5/2011 | Pandya |
| 7,949,683 | B2 | 5/2011 | Goyal |
| 7,962,434 | B2 | 6/2011 | Estan et al. |
| 8,024,802 | B1 | 9/2011 | Preston |
| 8,051,085 | B1 | 11/2011 | Srinivasan et al. |
| 8,180,803 | B2 | 5/2012 | Goyal |
| 8,301,788 | B2 | 10/2012 | Bouchard et al. |
| 8,392,590 | B2 | 3/2013 | Bouchard et al. |
| 8,407,794 | B2 | 3/2013 | Kim et al. |
| 8,473,523 | B2 | 6/2013 | Goyal |
| 8,516,456 | B1 | 8/2013 | Starovoitov et al. |
| 8,554,698 | B2 | 10/2013 | Bando et al. |
| 8,566,344 | B2 | 10/2013 | Bando et al. |
| 8,683,590 | B2 | 3/2014 | Namjoshi et al. |
| 8,862,585 | B2 | 10/2014 | Chao et al. |
| 9,083,731 | B2 | 7/2015 | Namjoshi et al. |
| 9,203,805 | B2 | 12/2015 | Goyal et al. |
| 9,280,600 | B2 | 3/2016 | Hay et al. |
| 9,398,033 | B2 | 7/2016 | Goyal et al. |
| 9,419,943 | B2 | 8/2016 | Goyal et al. |
| 9,426,165 | B2 | 8/2016 | Billa et al. |
| 9,426,166 | B2 | 8/2016 | Billa et al. |
| 9,432,284 | B2 | 8/2016 | Goyal et al. |
| 9,438,561 | B2 | 9/2016 | Goyal et al. |
| 9,495,479 | B2 | 11/2016 | Goyal |
| 9,507,563 | B2 | 11/2016 | Billa et al. |
| 9,514,246 | B2 | 12/2016 | Billa et al. |
| 9,563,399 | B2 | 2/2017 | Goyal et al. |
| 9,602,532 | B2 | 3/2017 | Goyal et al. |
| 9,762,544 | B2 | 9/2017 | Goyal et al. |
| 2001/0033552 | A1* | 10/2001 | Barrack .......... H04L 47/10 370/282 |
| 2003/0195874 | A1 | 10/2003 | Akaboshi |
| 2004/0059443 | A1 | 3/2004 | Sharangpani |
| 2004/0162826 | A1 | 8/2004 | Wyschogrod et al. |
| 2004/0172234 | A1 | 9/2004 | Dapp et al. |
| 2004/0225999 | A1 | 11/2004 | Nuss |
| 2005/0108518 | A1 | 5/2005 | Pandya |
| 2005/0278781 | A1 | 12/2005 | Zhao et al. |
| 2006/0069872 | A1 | 3/2006 | Bouchard et al. |
| 2006/0075206 | A1 | 4/2006 | Bouchard et al. |
| 2006/0085533 | A1 | 4/2006 | Hussain et al. |
| 2006/0101195 | A1 | 5/2006 | Jain |
| 2006/0136570 | A1 | 6/2006 | Pandya |
| 2006/0235811 | A1* | 10/2006 | Fairweather .......... G06F 8/427 706/12 |
| 2007/0192863 | A1 | 8/2007 | Kapoor et al. |
| 2007/0282833 | A1 | 12/2007 | McMillen |
| 2008/0034427 | A1 | 2/2008 | Cadambi et al. |
| 2008/0047012 | A1 | 2/2008 | Rubin et al. |
| 2008/0059464 | A1 | 3/2008 | Law et al. |
| 2008/0071783 | A1 | 3/2008 | Langmead et al. |
| 2008/0077793 | A1 | 3/2008 | Tan et al. |
| 2008/0082946 | A1 | 4/2008 | Zilic et al. |
| 2008/0097959 | A1 | 4/2008 | Chen et al. |
| 2008/0101371 | A1 | 5/2008 | Law et al. |
| 2008/0189784 | A1 | 8/2008 | Mangione-Smith et al. |
| 2008/0228991 | A1* | 9/2008 | Ferroussat .......... G06F 13/28 711/100 |
| 2008/0229415 | A1 | 9/2008 | Kapoor et al. |
| 2008/0262991 | A1 | 10/2008 | Kapoor et al. |
| 2008/0270833 | A1 | 10/2008 | McMillen |
| 2008/0271141 | A1 | 10/2008 | Goldman et al. |
| 2009/0106183 | A1 | 4/2009 | Estan et al. |
| 2009/0119279 | A1 | 5/2009 | Goyal et al. |
| 2009/0119399 | A1 | 5/2009 | Hussain et al. |
| 2009/0138440 | A1 | 5/2009 | Goyal |
| 2009/0138494 | A1 | 5/2009 | Goyal |
| 2010/0050177 | A1 | 2/2010 | Goyal et al. |
| 2010/0095162 | A1 | 4/2010 | Inakoshi |
| 2010/0114973 | A1 | 5/2010 | Goyal |
| 2010/0138367 | A1 | 6/2010 | Yamagaki |
| 2010/0146623 | A1 | 6/2010 | Namjoshi |
| 2010/0153420 | A1 | 6/2010 | Yang et al. |
| 2010/0158394 | A1 | 6/2010 | Chang et al. |
| 2010/0174770 | A1* | 7/2010 | Pandya .......... G06F 17/30985 709/200 |
| 2010/0192225 | A1 | 7/2010 | Ma et al. |
| 2010/0198850 | A1 | 8/2010 | Cytron et al. |
| 2011/0016154 | A1 | 1/2011 | Goyal et al. |
| 2011/0066637 | A1 | 3/2011 | Wang |
| 2011/0072199 | A1* | 3/2011 | Reiter .......... G06F 13/14 711/103 |
| 2011/0093484 | A1 | 4/2011 | Bando et al. |
| 2011/0093496 | A1 | 4/2011 | Bando et al. |
| 2011/0113191 | A1 | 5/2011 | Pandya |
| 2011/0119440 | A1 | 5/2011 | Pandya |
| 2011/0173490 | A1 | 7/2011 | Narayanaswamy et al. |
| 2011/0185077 | A1 | 7/2011 | Bremler-Barr et al. |
| 2011/0238855 | A1 | 9/2011 | Korsunsky et al. |
| 2011/0320393 | A1 | 12/2011 | Pandya |
| 2011/0320397 | A1 | 12/2011 | Podkolzin et al. |
| 2012/0017262 | A1 | 1/2012 | Kapoor et al. |
| 2012/0143854 | A1 | 6/2012 | Goyal et al. |
| 2012/0221494 | A1 | 8/2012 | Pasetto et al. |
| 2012/0221497 | A1 | 8/2012 | Goyal et al. |
| 2012/0275642 | A1 | 11/2012 | Aller et al. |
| 2012/0284222 | A1 | 11/2012 | Atasu et al. |
| 2012/0311529 | A1 | 12/2012 | Beveridge et al. |
| 2013/0074081 | A1 | 3/2013 | Cassetti et al. |
| 2013/0097608 | A1 | 4/2013 | Kessler et al. |
| 2013/0103909 | A1 | 4/2013 | Pangborn et al. |
| 2013/0133064 | A1 | 5/2013 | Goyal et al. |
| 2013/0191916 | A1 | 7/2013 | Yao et al. |
| 2013/0254197 | A1 | 9/2013 | Hay et al. |
| 2013/0290356 | A1 | 10/2013 | Yang et al. |
| 2014/0025923 | A1 | 1/2014 | Klein |
| 2014/0101176 | A1 | 4/2014 | Ruehle |
| 2014/0129775 | A1 | 5/2014 | Ruehle |
| 2014/0143894 | A1 | 5/2014 | Namjoshi et al. |
| 2014/0173254 | A1 | 6/2014 | Ruehle |
| 2014/0214749 | A1 | 7/2014 | Ruehle |
| 2015/0066927 | A1 | 3/2015 | Goyal et al. |
| 2015/0067123 | A1 | 3/2015 | Goyal et al. |
| 2015/0067776 | A1 | 3/2015 | Billa et al. |
| 2015/0067836 | A1 | 3/2015 | Billa et al. |
| 2015/0067863 | A1 | 3/2015 | Billa et al. |
| 2015/0186786 | A1 | 7/2015 | Goyal et al. |
| 2015/0220454 | A1 | 8/2015 | Goyal et al. |
| 2015/0220845 | A1 | 8/2015 | Goyal et al. |
| 2015/0262009 | A1 | 9/2015 | Szabo |

(56) References Cited

U.S. PATENT DOCUMENTS

| | | | |
|---|---|---|---|
| 2015/0293846 A1 | 10/2015 | Goyal et al. | |
| 2015/0295889 A1 | 10/2015 | Goyal et al. | |
| 2015/0295891 A1 | 10/2015 | Goyal et al. | |
| 2016/0021060 A1 | 1/2016 | Goyal et al. | |
| 2016/0021123 A1 | 1/2016 | Goyal et al. | |

FOREIGN PATENT DOCUMENTS

| | | | |
|---|---|---|---|
| CN | 101296116 A | 10/2008 | |
| CN | 101351784 A | 1/2009 | |
| CN | 101360088 A | 2/2009 | |
| CN | 102148805 A | 8/2011 | |
| CN | 102420750 A | 4/2012 | |
| CN | 102902713 A | 1/2013 | |
| CN | 103166802 A | 6/2013 | |
| EP | 2276217 A2 | 1/2011 | |
| WO | WO 2004/013777 A1 | 2/2004 | |
| WO | WO 2007/109445 A1 | 9/2007 | |
| WO | WO 2008/005772 A2 | 1/2008 | |
| WO | WO 2009/017131 | 2/2009 | |
| WO | WO 2013/078053 | 5/2013 | |

OTHER PUBLICATIONS

Branch, J.W. et al., "Denial of Service Intrusion Detection Using Time Dependent Deterministic Finite Automata," *Proc. Research Conference, Troy, NY*, Oct. 2002.

Faro, S., et al., "Efficient Variants of the Backward-Oracle-Matching Algorithm," *Proceedings of Prague Stringology Conference*, 2008, pp. 146-160.

Navarro, G., "NR-Grep: A Fast and Flexible Pattern Matching Tool," pp. 1-49, published 2000.

Navarro, G., "Pattern Matching," pp. 1-24, published 2002.

Becchi, M., "Data Structures, Algorithms and Architectures for Efficient Regular Expression Evaluation," Washington University in St. Louis School of Engineering & Applied Science, published May 2009.

Becchi, M., et al., "A Hybrid Finite Automation for Practical Deep Packet Inspection," published 2007.

Becchi, M., et al., "Extending Finite Automata to Efficiently Match Perl-compatible Regular Expressions", Proceedings of the 2008 CoNext Conference, Dec. 9-12, 2008.

Chodnicki, S., "An Introduction to Regular Expressions/Adventures with Open Source B1", available at http://type-exit.org/adventures-with-open-source-bi/2011/05/an-introduction-to-regular-expressions May 7, 2013 (29 pgs).

Hoperoft, J.E. and Ullman, J.D., "Introduction to Automata Theory, Languages, and Computation," Addison-Wesley Publishing, Reading, Massachusetts (1979). ISBN 0-201-02988-X. (See chapter 2.).

Rabin, M.O. and Scott, D., "Finite Automata and their Decision Problems," IBM Journal of Research and Development, 3(2): 114-125 (1959).

Singh, H., Regular Expressions, http://www.seeingwithe.org/topic7html.html (2002) downloaded May 7, 2013 (10 pgs).

Sipser, M., "Introduction to the Theory of Computation," PWS, Boston (1997). ISBN 0-534-94728-X. (See section 1.2: Nondeterminism, pp. 47-63.).

Sun, W., et al., "HFilter: Hybrid Finite Automation Based Stream Filtering for Deep and Recursive XML Data," School of Computer Science and Tech., published 2008.

NITROX DPI CN17XX L7 Content Processor Family Preliminary Product Brief. Cavium Networks 2009. http://cavium.com/pdfFiles/Nitrox_DPI_PB_v1.pdf. Retrieved Apr. 6, 2017.

Košař, V., et al., "Towards Efficient Field Programmable Pattern Matching Array," 2015 Euromicro Conference on Digital System Design, IEEE, pp. 1-8 (2015).

Peng, K., et al., "Chain-Based DFA Deflation for Fast and Scalable Regular Expression Matching Using TCAM," ACM/IEEE Seventh Symposium on Architectures for Networking and Communications Systems Year 2011, pp. 24-35 (2011).

Lin, C-H., et al., "Optimization of Pattern Matching Circuits for Regular Expression of FPGA," IEEE Transactions on Very Large Scale Integration (VLSI) Systems, 15(12): 1303-1310 (2007).

Clark, C.R., et al., "Scalable Pattern Matching for High Speed Networks," 12th Annual IEEE Symposium on Field Programmable Custom Computing Machines, pp. 249-257 (2004).

\* cited by examiner

NFA for .*a[^\n]
Graph size of 4 nodes

NFA for .*a[^\n][^\n]
Graph size of 5 nodes

NFA for .*a[^\n][^\n][^\n]
Graph size of 6 nodes

| PATTERN | NUMBER OF NFA-NODES | NUMBER OF DFA-NODES |
|---|---|---|
| .*a[^\n] | 4 | 4 |
| .*a[^\n][^\n] | 5 | 8 |
| .*a[^\n][^\n][^\n] | 6 | 16 |
| .*a[^\n][^\n][^\n][^\n] | 7 | 32 |
| .*a[^\n][^\n][^\n][^\n][^\n] | 8 | 64 |
| * | * | * |
| * | * | * |
| * | * | * |
| .*a[^\n]$_1$...[^\n]$_n$ | $n+3$ | $2^n$ |

FIG. 2G

| | CURRENT NODE | CURRENT OFFSET/ SEGMENT | MATCH RESULT 624 | ACTION 626 |
|---|---|---|---|---|
| 628a | N0 | 0/h | POSITIVE | UPDATE OFFSET / TRANSITION |
| 628b | N1N3' | — | — | PUSH {N1N3',OFFSET1} / TRANSITION |
| 628c | N2 | 1/x | NEGATIVE | POP {N1N3',OFFSET1} / TRANSITION |
| 628d | N1N3' | 1/x | POSITIVE | UPDATE OFFSET / TRANSITION |
| 628e | N2 | 2/a | POSITIVE | UPDATE OFFSET / TRANSITION |
| 628f | N4 | 3/b | POSITIVE | UPDATE OFFSET / TRANSITION |
| 628g | N5 | — | — | DISCONTINUE / WRITE RESULT |

FIG. 6B

MEMORY MANAGEMENT FOR FINITE AUTOMATA PROCESSING

RELATED APPLICATIONS

This application claims the benefit of U.S. Provisional Application No. 61/872,612, filed on Aug. 30, 2013 and U.S. Provisional Application No. 61/872,622, filed on Aug. 30, 2013. The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at "wire-speed" (i.e., a rate of data transfer over a physical medium of the network over which data is transmitted and received).

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor may perform such compute intensive tasks, it may not provide sufficient performance to process the data so that the data may be forwarded at wire-speed.

An Intrusion Detection System (IDS) application may inspect content of individual packets flowing through a network, and may identify suspicious patterns that may indicate an attempt to break into or compromise a system. One example of a suspicious pattern may be a particular text string in a packet followed by 100 characters later by another particular text string. Such content aware networking may require inspection of the contents of packets at wire speed. The content may be analyzed to determine whether there has been a security breach or an intrusion.

A large number of patterns and rules in the form of regular expressions (also referred to herein as regular expression patterns) may be applied to ensure that all security breaches or intrusions are detected. A regular expression is a compact method for describing a pattern in a string of characters. The simplest pattern matched by a regular expression is a single character or string of characters, for example, /c/ or /cat/. The regular expression may also include operators and meta-characters that have a special meaning Through the use of meta-characters, the regular expression may be used for more complicated searches such as, "abc.*xyz." That is, find the string "abc" followed by the string "xyz," with an unlimited number of characters in-between "abc" and "xyz." Another example is the regular expression "abc..abc.*xyz;" that is, find the string "abc," followed two characters later by the string "abc," and an unlimited number of characters later by the string "xyz."

Content searching is typically performed using a search method such as, Deterministic Finite Automata (DFA) or Non-Deterministic Finite Automata (NFA) to process the regular expression.

SUMMARY

Embodiments of the present invention provide a method, apparatus, computer program product, and corresponding system that may search an input stream for at least one regular expression pattern using at least one finite automaton.

According to one embodiment, a method may comprise operatively coupling at least one processor to at least one memory in a security appliance operatively coupled to a network. The at least one memory may be configured to store a first finite automaton, at least one second finite automaton, and a run stack. The at least one processor may be configured to search for at least one regular expression pattern in a flow. The search may include initializing a search context in the run stack based on (i) partial match results determined from walking segments of a payload of the flow through the first finite automaton and (ii) a historical search context associated with the flow. The search may include modifying the search context via push or pop operations to direct the at least one processor to walk segments of the payload through the at least one second finite automaton to explore whether at least one partial match of at least one regular expression pattern advances along at least one path of the at least one second finite automaton. The search may include maintaining the search context in a manner obviating overflow of the search context and obviating stalling of the push or pop operations.

The search context may include a plurality of search context entries and each search context entry is determined based on a given positive partial match result of the partial match results.

Initializing the search context in the run stack may include generating a respective subpattern search context entry for each partial match of the at least one regular expression pattern identified as matching in the flow based on walking segments of the payload of the flow through the first finite automaton. Initializing the search context in the run stack may include merging the historical search context and each respective subpattern search context entry in the run stack.

Merging the historical search context and each respective subpattern search context entry in the run stack may include obviating copying of each respective subpattern search context entry and each search context entry of the historical search context.

Obviating copying may include skipping over each respective subpattern search context entry and each search context entry that has a context entry type field configured with a no operation (NOP) type of a plurality of node types.

Merging the historical search context and each respective subpattern search context entry in the run stack may include linking chunks of fixed size buffers via next and previous pointers. Each fixed size buffer may be configured to store a given number of search context entries.

Each at least one second finite automaton may be a per-pattern non-deterministic finite automaton (NFA) generated for a respective regular expression pattern. Each at least one subpattern search context generated for the flow may include a node identifier of a given node of a given per-pattern NFA of the at least one second finite automaton, the given per-pattern NFA generated for a given regular expression pattern including the respective subpattern. Each at least one subpattern search context generated for the flow may include a location identifier of a given segment of the segments of the payload. The at least one processor may be configured to advance the search by subsequently walking the given segment at the given node. The given segment may be identified based on the location identifier. Each at least one subpattern search context generated for the flow may include a walk direction for subsequently walking a next segment of the payload at a next node of the given per-pattern NFA. The at least one processor may be configured to advance the search by subsequently walking the next segment at the next node based on a positive match of the given segment at the given node.

The at least one memory may further include a save buffer and the historical search context may include one or more search context entries from a previous search context associated with the flow and saved from the run stack to the save buffer.

The payload may be a current payload and the previous search context may have been saved from the run stack to the save buffer based on detection of a payload boundary of a previous payload of the flow during walking of segments of the previous payload through the at least one second finite automaton.

The payload may be a current payload and the historical search context may include at least one search context entry configured to enable the at least one processor to walk a given node of a given second finite automaton of the at least one second finite automaton with a given segment of the current payload. The historical search context may have been created based on detection of a payload boundary during NFA processing of a previous payload in the flow.

The search context may include at least one search context entry that includes a plurality of fields. The plurality of fields may include a context entry type field that is based on a node type, of a plurality of node types, of the given node. The context entry type field may signify which fields, of the plurality of fields, are relevant for the node type. The plurality of fields may further include a match type field that is relevant based on the context entry type field, the match type field being based on the node type and used to determine whether the given node is configured to match a single instance or multiple consecutive instances of a given element in an input stream received from the network. The plurality of fields may further include an element field that is relevant regardless of the context entry type field and identifies the given element for matching at the given node. The plurality of fields may further include a next node address field that is relevant regardless of the context entry type field and identifies a next node. The plurality of fields may further include a count field that is relevant based on the context entry type field and identifies a count value, indicating a number of consecutive instances remaining for positively matching to the given element or having been positively matched to the given element, at the given node, based on the context entry type field. The plurality of fields may further include a discard unexplored context (DUP) field that is relevant regardless of the context entry type field and identifies whether to discard the context or walk the next node based on the context, in an event a complete match of at least one regular expression is detected in the input stream. The plurality of fields may further include a reverse walk direction field that is relevant regardless of the context entry type field and identifies a reverse or forward direction of walking. The plurality of fields may further include an offset field that is relevant regardless of the context entry type field and identifies an offset of a segment of a payload in the input stream for matching to the given element at the given node or to a next element at the next node, based on the context entry type field, the next element identified via metadata associated with the next node.

The at least one memory may include a save buffer and the search may include saving the search context from the run stack to the save buffer based on detecting a payload boundary of the payload during the walk of segments of the payload through the at least one second finite automaton. The search context may be saved to the save buffer in association with the flow to enable the at least one processor to employ the saved search context as the historical search context for directing the at least one processor to walk a previous or subsequent payload of the flow through the at least one second finite automata.

Obviating overflow of the search context and obviating stalling of the push or pop operations may include maintaining the search context by employing an internal circular buffer and an external circular buffer and the run stack has a Last-In-First-Out (LIFO) characteristic.

Maintaining the search context may include maintaining entries of the external circular buffer as a doubly linked list of chunks of fixed size buffers each configured to store a given number of search context entries.

Maintaining the search context may include maintaining a first portion of the search context from the run stack in the internal circular buffer and a second portion of the search context from the run stack in the external circular buffer.

The search may include transferring search context entries between the internal and external circular buffers in a manner that prevents (i) overflow of the internal circular buffer (ii) a combination of an empty state of the internal circular buffer and a non-empty state of the external circular buffer to obviate stalling of the pop operation and (iii) a full state of the internal circular buffer by maintaining a given number of empty search context entries to obviate stalling of the push operation.

The search may include transferring context entries between the internal and external circular buffers as a function of low and high watermarks associated with the internal circular buffer.

The search may include transferring context entries from the internal circular buffer to the external circular buffer based on a total number of context entries stored in the internal circular buffer relative to the high watermark. The search may include transferring context entries from the external circular buffer to the internal circular buffer based on the total number of context entries stored in the on-chip buffer relative to the low watermark, wherein each transfer is a direct memory access (DMA) transfer.

The at least one processor may be operatively coupled to least one network interface. The payload may be in an input stream received via the at least one network interface. The input stream may include multiple packets with payloads of the flow that are consecutive or non-consecutive packets in the input stream.

Another example embodiment disclosed herein includes an apparatus corresponding to operations consistent with the method embodiments disclosed herein.

Further, yet another example embodiment may include a non-transitory computer-readable medium having stored thereon a sequence of instructions which, when loaded and executed by a processor, causes a processor to perform methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-G are example NFA and DFA graphs and a table illustrating the concept of graph explosion.

FIG. 6B is a table of an example embodiment of processing cycles for traversing the NFA graph of FIG. 6A with the payload.

DETAILED DESCRIPTION

Before describing example embodiments of the present invention in detail, an example security application in which the embodiments may be implemented and typical processing using deterministic finite automata (DFA) and non-deterministic finite automata (NFA) are described immediately below to help the reader understand inventive features disclosed herein.

Figure 1:
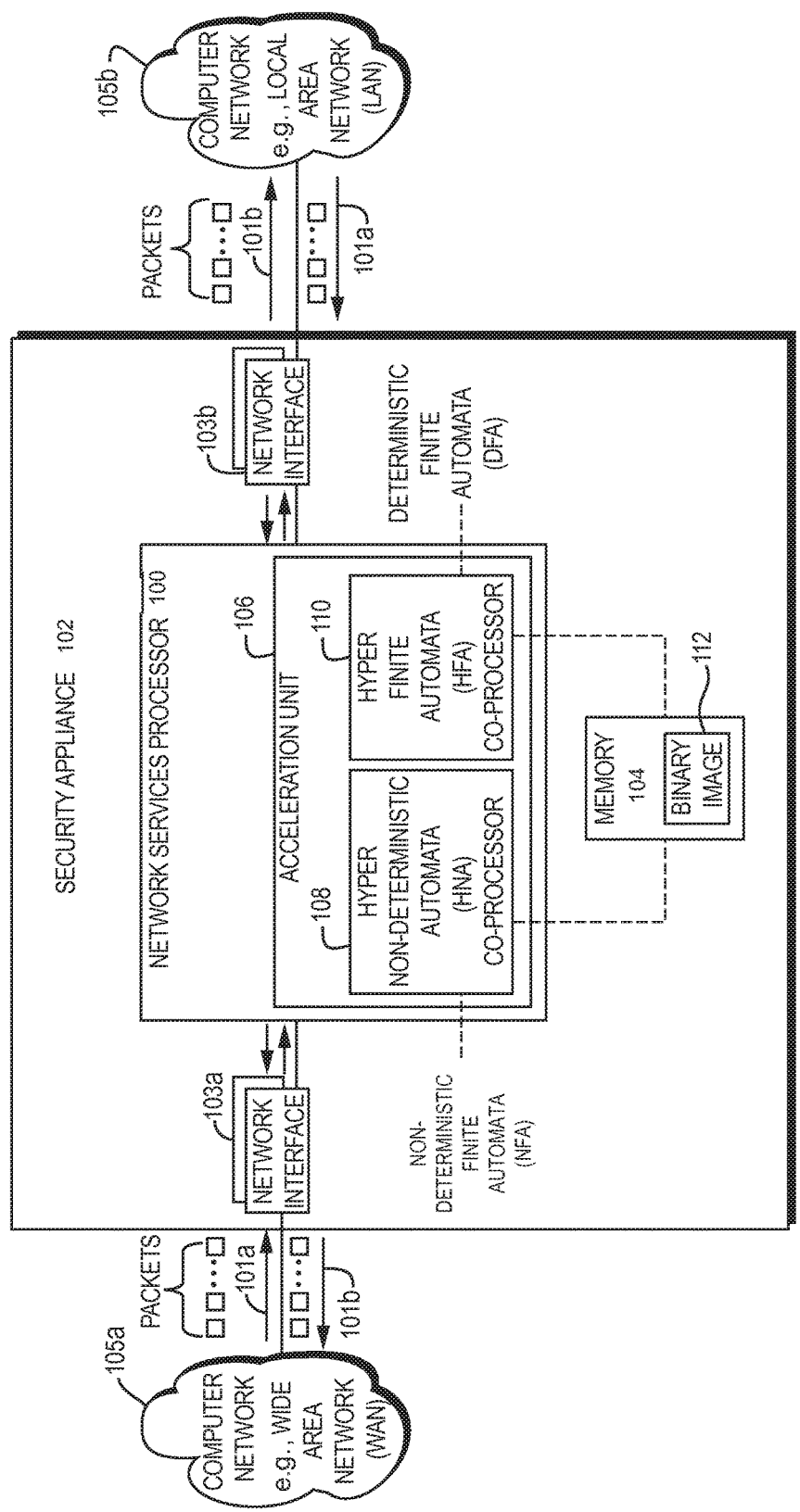
FIG. 1 is a block diagram of an embodiment of a security appliance in which embodiments disclosed herein may be implemented.

FIG. 1 is a block diagram of an embodiment of a security appliance 102 in which embodiments disclosed herein may be implemented. The security appliance 102 may include a network services processor 100. The security appliance 102 may be a standalone system that may switch packets received at one network interface 103a to another network interface 103b and may perform a plurality of security functions on received packets prior to forwarding the packets. For example, the security appliance 102 may be used to perform security processing on packets 101a that may be received on a Wide Area Network (WAN) 105a, or any other suitable network, prior to forwarding the processed packets 101b to a Local Area Network (LAN) 105b, or any other suitable network.

The network services processor 100 may be configured to process Open System Interconnection (OSI) network L2-L7 layer protocols encapsulated in received packets. As is well-known to those skilled in the art, the OSI reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communications between users, for example, file transfer and electronic mail.

The network services processor 100 may schedule and queue work (e.g., packet processing operations) for upper level network protocols, for example L4-L7, and enable processing of upper level network protocols in received packets to be performed to forward packets at wire-speed. By processing the protocols to forward the packets at wire-speed, the network services processor 100 does not slow down the network data transfer rate. The network services processor 100 may receive packets from the network interfaces 103a or 103b that may be physical hardware interfaces, and may perform L2-L7 network protocol processing on the received packets. The network services processor 100 may subsequently forward processed packets 101b through the network interfaces 103a or 103b to another hop in the network, a final destination, or through another bus (not shown) for further processing by a host processor (not shown). The network protocol processing may include processing of network security protocols such as Firewall, Application Firewall, Virtual Private Network (VPN)

including IP Security (IPSec) and/or Secure Sockets Layer (SSL), Intrusion Detection System (IDS) and Anti-virus (AV).

The network services processor 100 may deliver high application performance using a plurality of processors (i.e., cores). Each of the cores (not shown) may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). The data plane operation may include processing of other portions of these complex higher level protocols.

The network services processor 100 may also include application specific co-processors that may offload the cores so that the network services processor 100 achieves high-throughput. For example, the network services processor 100 may include an acceleration unit 106 that may include a hyper non-deterministic automata (HNA) co-processor 108 for hardware acceleration of NFA processing and a hyper finite automata (HFA) co-processor 110 for hardware acceleration of DFA processing. The HNA 108 and HFA 110 co-processors may be configured to offload the network services processor 100 general purpose cores (not shown) from the heavy burden of performing compute and memory intensive pattern matching methods.

The network services processor 100 may perform pattern searching, regular expression processing, content validation, transformation, and security accelerate packet processing. The regular expression processing and the pattern searching may be used to perform string matching for AV and IDS applications and other applications that may require string matching. A memory controller (not shown) in the network services processor 100 may control access to a memory 104 that is operatively coupled to the network services processor 100. The memory may be internal (i.e., on-chip) or external (i.e., off chip), or a combination thereof, and may be configured to store data packets received, such as packets 101a for processing by the network services processor 100. The memory may be configured to store compiled rules data utilized for lookup and pattern matching in DFA and NFA graph expression searches. The compiled rules data may be stored as a binary image 112 that may include compiled rules data for both DFA and NFA, or multiple binary images separating DFA compiled rules data from NFA compiled rules data.

Typical content aware application processing may use either a DFA or an NFA to recognize patterns in content of received packets. DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z and 0-9, and meta-characters, such as, *, ^ and |. The atomic elements of a regular expression are the symbols (single characters) to be matched. Atomic elements may be combined with meta-characters that allow concatenation, alternation (|), and Kleene-star (*). The meta-character for concatenation may be used to create multiple character matching patterns from a single character (or sub-strings) while the meta-character for alternation (|) may be used to create a regular expression that can match any of two or more sub-strings. The meta-character Kleene-star (*) allows a pattern to match any number of times, including no occurrences of the preceding character or string of characters.

Combining different operators and single characters allows complex subpatterns of expressions to be constructed. For example, a subpattern such as (th(is|at)*) may match multiple character strings, such as: th, this, that, thisis, thisat, thatis, or thatat. Another example of a complex subpattern of an expression may be one that incorporates a character class construct [ . . . ] that allows listing of a list of characters for which to search. For example, gr[ea]t' looks for both grey and gray. Other complex subpattern examples are those that may use a dash to indicate a range of characters, for example, [A-Z], or a meta-character "." that matches any one character. An element of the pattern may be an atomic element or a combination of one or more atomic elements in combination with one or more meta-characters.

The input to the DFA or NFA state machine is typically a segment, such as a string of (8-bit) bytes, that is, the alphabet may be a single byte (one character or symbol), from an input stream (i.e., received packets). Each segment (e.g., byte) in the input stream may result in a transition from one state to another state. The states and the transition functions of the DFA or NFA state machine may be represented by a graph. Each node in the graph may represent a state and arcs (also referred to herein as transition arcs) in the graph may represent state transitions. A current state of the state machine may be represented by a node identifier that selects a particular node in the graph.

Using DFA to process a regular expression and to find a pattern or patterns described by a regular expression in an input stream of characters may be characterized as having deterministic run time performance. A next state of a DFA may be determined from an input character (or symbol), and a current state of the DFA, because there is only one state transition per DFA state. As such, run time performance of the DFA is said to be deterministic and the behavior can be completely predicted from the input. However, a tradeoff for determinism is a graph in which the number of nodes (or graph size) may grow exponentially with the size of a pattern.

In contrast, the number of nodes (or graph size) of an NFA graph may be characterized as growing linearly with the size of the pattern. However, using NFA to process the regular expression, and to find a pattern or patterns described by the regular expression in the input stream of characters, may be characterized as having non-deterministic run time performance. For example, given an input character (or symbol) and a current state of the NFA, it is possible that there is more than one next state of the NFA to which to transition. As such, a next state of the NFA cannot be uniquely determined from the input and the current state of the NFA. Thus, run time performance of the NFA is said to be non-deterministic as the behavior cannot be completely predicted from the input.

Figure 2A:
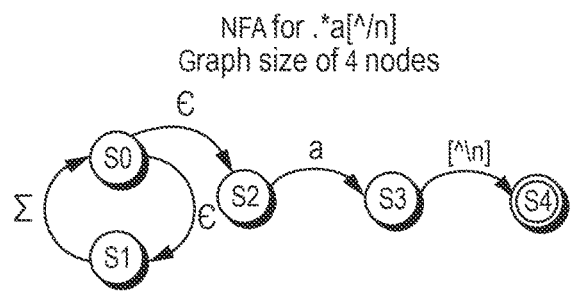
Figure 2B:
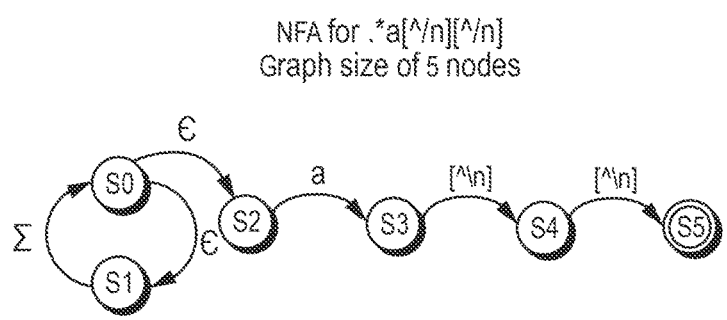
Figure 2C:
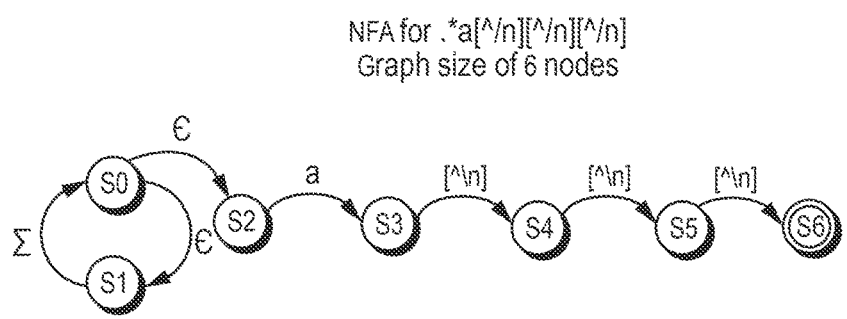
Figure 2D:
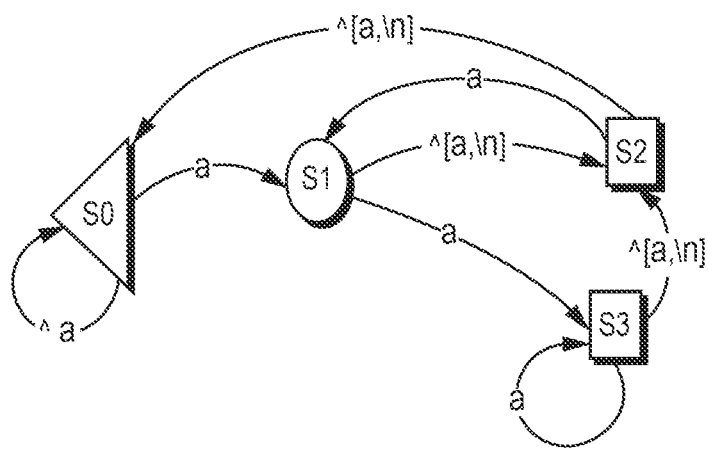
Figure 2E:
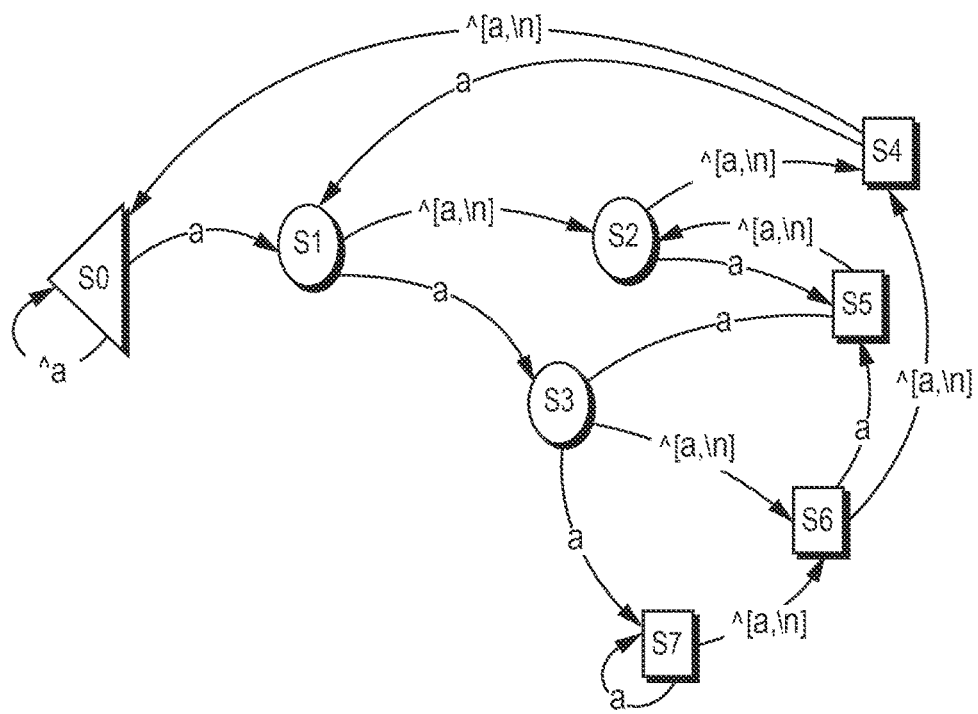
Figure 2F:
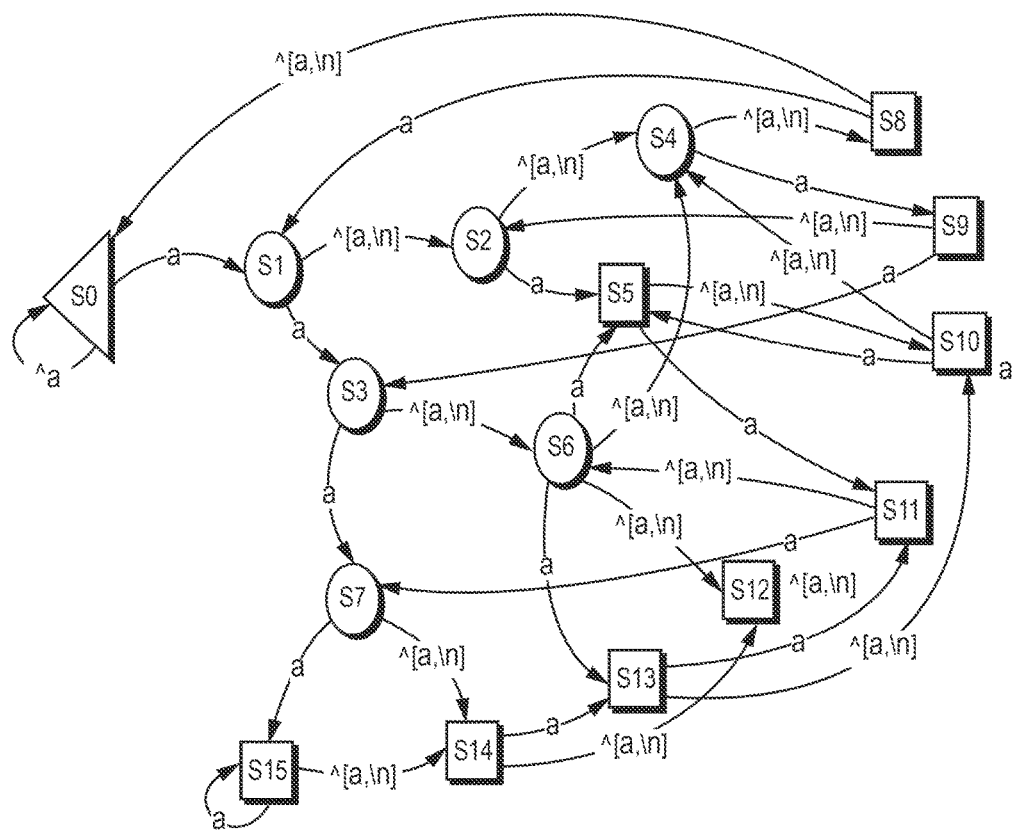

FIGS. 2A-G show the concept of DFA "graph explosion." FIGS. 2A, 2B, and 2C show NFA graphs for patterns ".*a[^\n]," ".*a[^\n] [^\n]," ".*a[^\n] [^\n] [^\n]," respectively, and FIGS. 2D, 2E, and 2F show DFA graphs for the same patterns, respectively. As shown in FIGS. 2A-2F, and summarized by the table of FIG. 2G, an NFA graph may grow linearly for some patterns while a DFA graph for the same patterns may grow exponentially resulting in a graph explosion. As shown, for a given pattern or patterns, a number of DFA states may be larger than a number of NFA states, typically on the order of several hundred more or a thousand more states. This is an example of "graph explosion," which is a hallmark characteristic of DFA.

According to embodiments disclosed herein, content searching may be performed using DFA, NFA, or a combination thereof. According to one embodiment, a run time processor, co-processor, or a combination thereof, may be implemented in hardware and may be configured to implement a compiler and a walker.

The compiler may compile a pattern or an input list of patterns (also known as signatures or rules) into the DFA, NFA, or combination thereof. The DFA and NFA may be binary data structures, such as DFA and NFA graphs and tables.

The walker may perform run time processing, for example, actions that may identify an existence of a pattern in an input stream, or matching the pattern to content in the input stream. Content may be a payload portion of an Internet Protocol (IP) datagram, or any other suitable payload in an input stream. Run time processing of DFA or NFA graphs may be referred to herein as walking or traversing the DFA or NFA graphs, with the payload, to determine a pattern match. A processor configured to generate DFA, NFA, or a combination thereof, may be referred to herein as a compiler. A processor configured to implement run time processing of a payload using the generated DFA, NFA, or combination thereof, may be referred to as a walker herein. According to embodiments disclosed herein, the network services processor 100 may be configured to implement a compiler and a walker in the security appliance 102.

Figure 3:
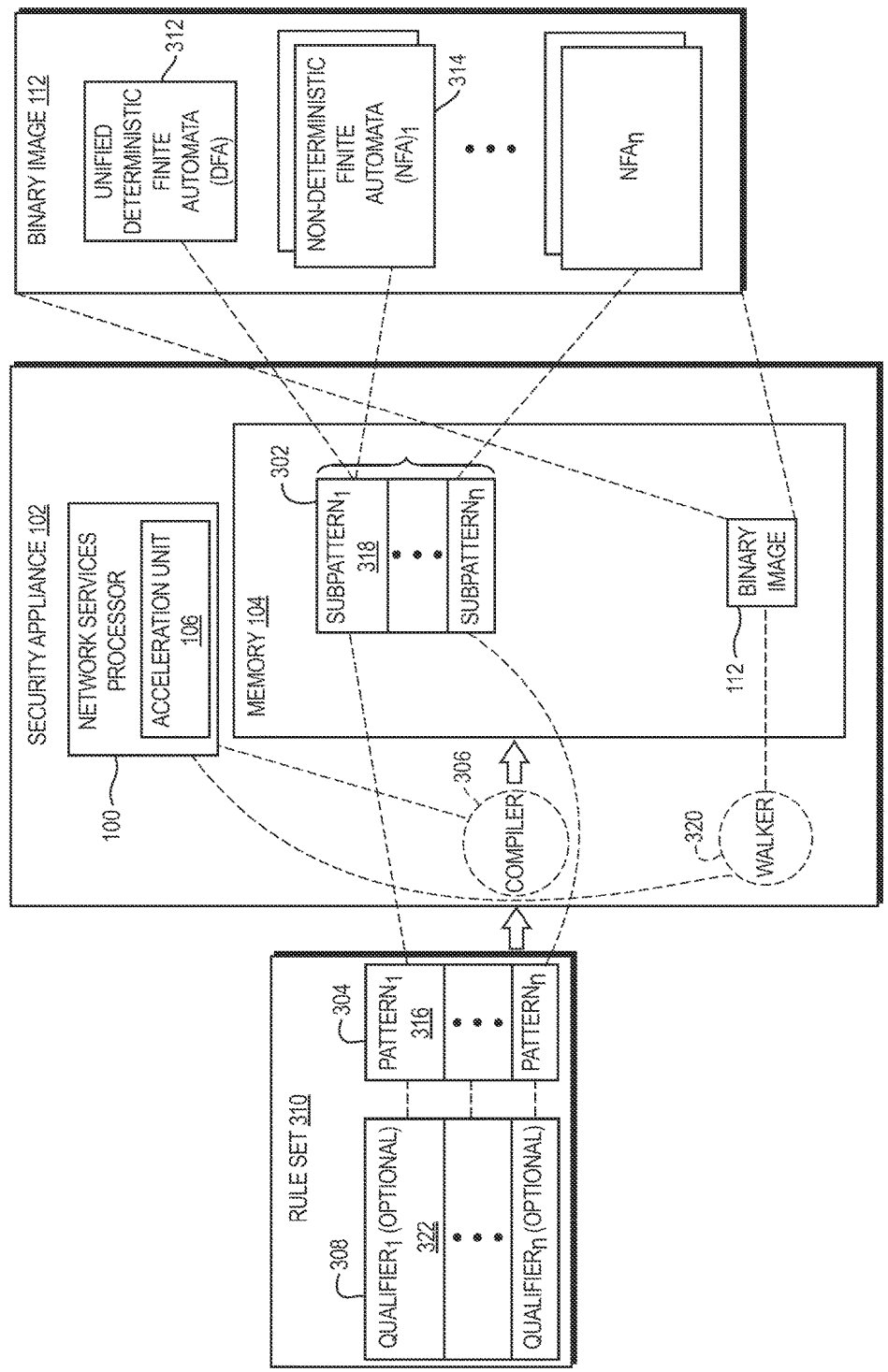
FIG. 3 is another block diagram of an embodiment of a security appliance in which embodiments disclosed herein may be implemented.

FIG. 3 is a block diagram of another embodiment of the security appliance 102 of FIG. 1 in which embodiments disclosed herein may be implemented. As described in reference to FIG. 1, the security appliance 102 may be operatively coupled to one or more networks and may comprise the memory 104 and the network services processor 100 that may include the acceleration unit 106. In reference to FIG. 3, the network services processor 100 may be configured to implement a compiler 306 that generates the binary image 112 and a walker 320 that uses the binary image 112. For example, the compiler 306 may generate the binary image 112 that includes compiled rules data used by the walker 320 for performing pattern matching methods on received packets 101a (shown in FIG. 1). The compiler 306 may generate the binary image 112 by determining compiled rules data for DFA, NFA, or a combination thereof, based on determining rules data advantageously suited for DFA and NFA.

According to embodiments disclosed herein, the compiler 306 may generate the binary image 112 by processing a rule set 310 that may include a set of one or more regular expression patterns 304 and optional qualifiers 308. From the rule set 310, the compiler 306 may generate a unified DFA 312 using subpatterns selected from all of the one or more regular expression patterns and at least one NFA 314 for at least one pattern in the set of one or more regular expression patterns 304 for use by the walker 320 during run time processing, and metadata (not shown) including mapping information for transitioning the walker 320 between states (not shown) of the unified DFA 312 and states of the at least one NFA 314. According to embodiments disclosed herein, each NFA that is generated may be for a particular pattern in the set, whereas a unified DFA may be generated based on all subpatterns from all patterns in the set. An NFA that is generated for a particular pattern may be referred to herein as a per-pattern NFA or a per-rule NFA.

The unified DFA 312 and the at least one NFA 314 may be represented data structure-wise as graphs, or in any other suitable form, and the mapping in the metadata may be represented data structure-wise as one or more tables, or in any other suitable form. According to embodiments disclosed herein, if a subpattern selected from a given pattern is the entire given pattern, then no NFA is generated for the given pattern.

The walker 320 may be configured to walk the unified DFA 312 and the at least one NFA 314 with a payload by transitioning states of the unified DFA 312 and the at least one NFA based on processing (also referred to herein as consuming) segments from the payload in the received packets 101a. Processing may including updating a current offset within the payload from a current segment to another segment. Updating the current offset may be based on a direction of walking, for example, the walker 320 may walk the unified DFA 312 or the at least one NFA 314 in a forward or reverse direction, incrementing the current offset based on the forward direction of the walk and decrementing the current offset based on the reverse direction of the walk. As such, the walker 320 walks the payload through the unified DFA 312 and the at least one NFA 314. According to embodiments disclosed herein, updating the current offset may include incrementing or decrementing the current offset based on a forward or reverse direction of the walk, respectively. As such, incrementing or decrementing of the current offset is for illustrative purpose in accordance with a direction of the walk of the examples.

The rule set 310 may include a set of one or more regular expression patterns 304 and may be in a form of a Perl Compatible Regular Expression (PCRE) or any other suitable form currently known or hereinafter developed. PCRE has become a de facto standard for regular expression syntax in security and networking applications. As more applications requiring deep packet inspections have emerged or more threats have become prevalent in the Internet, corresponding signatures/patterns to identify virus/attacks or applications have also become more complex. For example, signature databases have evolved from having simple string patterns to regular expression (regex) patterns with wild card characters, ranges, character classes, and advanced PCRE signatures.

As shown in FIG. 3, the optional qualifiers 308 may each be associated with a pattern in the set of regular expression patterns 304. For example, optional qualifiers 322 may be associated with pattern 316. The optional qualifiers 308 may each be one or more qualifiers designating desired custom, advanced PCRE signature options, or other suitable options for processing the pattern associated with the qualifiers. The compiler 306 may generate a unified DFA 312 using subpatterns 302 selected from all patterns in the set of one or more regular expression patterns 304. The compiler 306 may select subpatterns 302 from each pattern in the set of one or more regular expression patterns 304. The compiler 306 may also generate at least one NFA 314 for at least one pattern 316 in the set, a portion (not shown) of the at least one pattern 316 used for generating the at least one NFA 314, and at least one walk direction for run time processing (i.e. walking) of the at least one NFA 314, may be determined based on whether a length of the subpattern selected 318 is fixed or variable and a location of the subpattern selected 318 within the at least one pattern 316. The compiler 306 may store the unified DFA 312 and the at least one NFA 314 in the at least one memory 104.

A subpattern is a set of one or more consecutive elements from a pattern, wherein each element from the pattern may be represented by a node in a DFA or NFA graph, for purposes of matching segments from the payload. An element, as described above, may be a single text character represented by a node or a character class represented by a node. The compiler 306 may determine which subpatterns in the pattern are better suited for NFA based on whether or not a subpattern is likely to cause excessive DFA graph explosion, as described above in reference to FIGS. 2A-G. For example, generating a DFA from a subpattern including consecutive text characters would not result in DFA graph explosion, whereas complex subpatterns, as described above, may include operators as well as characters and, thus, may cause DFA graph explosion. For example, a subpattern including a wild card character or a larger character class repeated multiple times (e.g., [^\n]* or [^\n] {16}) may cause excessive states in a DFA and, thus, may be more advantageously suited for NFA.

Determining the match of the entire pattern may be found by utilizing match results from the unified DFA, the at least one NFA, or a combination thereof. According to embodiments disclosed herein, if a payload in the received packets 101 includes content that matches a subpattern selected 318 from a pattern 316, the walker may transition to walk at least one NFA for the subpattern selected 318. The walker 320 may report a match of the subpattern selected 318 and an offset that identifies a location in the received packets of the last character of the matching subpattern as an end offset for the subpattern in the payload.

A subpattern match may be a partial match for the pattern if the subpattern is a subset of the pattern. As such, the walker 320 may continue the search for the remainder of the pattern in the payload by walking at least one NFA for the pattern, in order to determine a final match for the pattern. It should be understood that the pattern may traverse one or more payloads in the received packets 101a.

Figure 4:
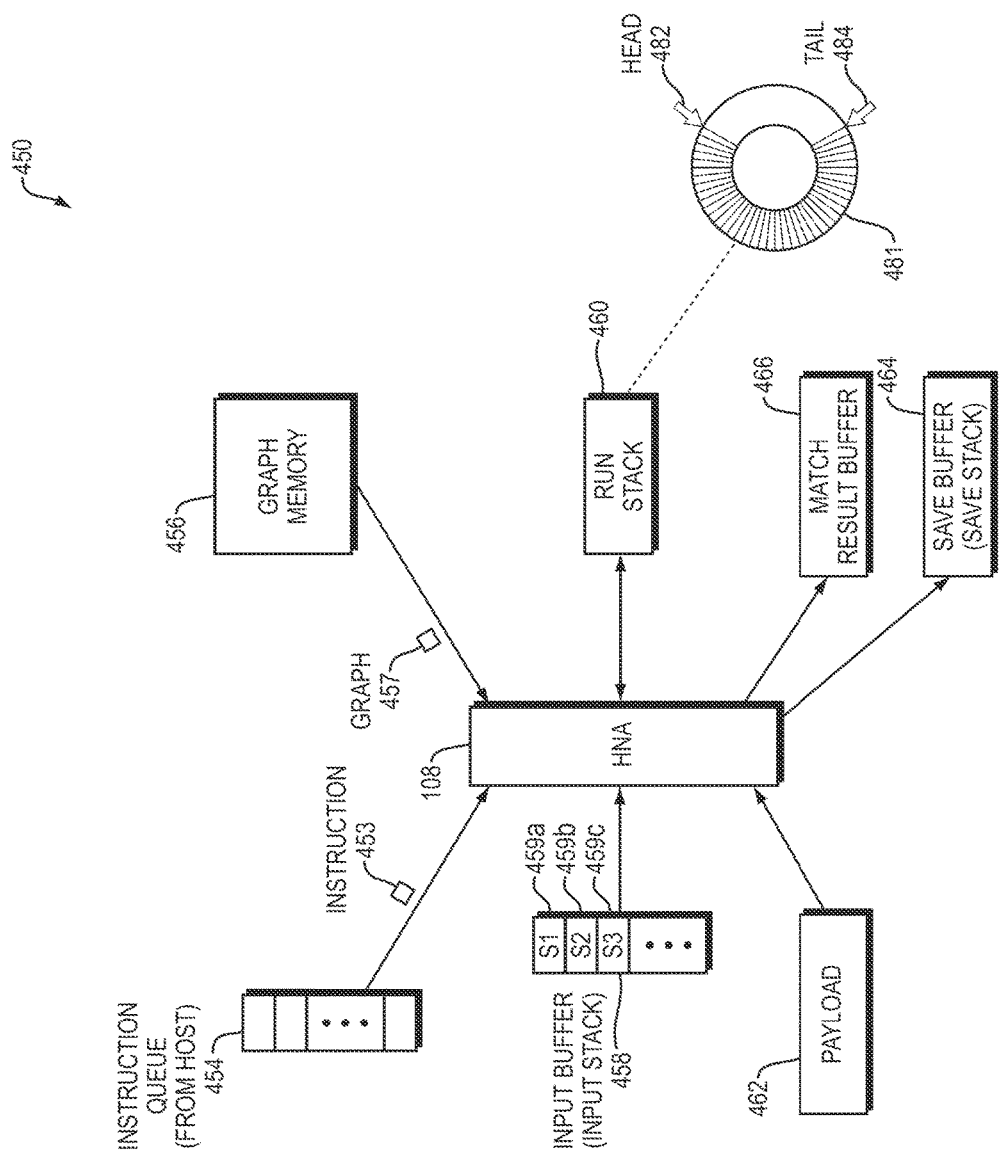
FIG. 4 is a block diagram of an example embodiment of an environment of a hyper non-deterministic automata (HNA) co-processor.

FIG. 4 is a block diagram 450 of an example embodiment of an environment of the HNA co-processor 108 of FIG. 1. According to embodiments disclosed herein, the HFA 110 may be configured to implement functionality of the walker 320 with reference to DFA processing and the HNA 108 may be configured to implement functionality of the walker 320 with reference to NFA processing.

According to embodiments disclosed herein, the HNA 108 may be configured to read at least one instruction 453 from an instruction queue 454. The instruction queue 454 may be configured to store the at least one instruction 453 that may be sent by a host (not shown) to be processed by the HNA 108. The at least one instruction 453 may include at least one job, such as S1 459a, S2 459b, or S3 459c. Each at least one job may be determined based on partial match results identified by the HFA co-processor 110 of FIG. 1 for a given subpattern of the subpatterns 302 of FIG. 3 that is matching in the input stream or from a previous save buffer.

A given job of the at least one job may indicate a given NFA of the at least one NFA 314, at least one given node of the given NFA, at least one given offset in a given payload, as well as at least one walk direction, each at least one walk direction corresponding to one node of the at least one given node. Each at least one job may include results of processing by the HFA, enabling the HNA to advance a match in the given NFA for a given pattern of the at least one pattern 304 that corresponds to the given subpattern. As such, each job represents partial match results determined by the HFA co-processor 110 in order to advance the match of the given pattern by the HNA co-processor 108.

The HNA 108 may process the at least one instruction 453 by reading at least one pointer (not shown), or other suitable instruction information, stored therein. The at least one pointer may include an input stack pointer (not shown) to an input stack 458. The at least one instruction 453 may also include a payload pointer (not shown) to a payload 462, a result buffer pointer (not shown) to a match result buffer 466, a save buffer pointer (not shown) to a save buffer 464, and a run stack pointer (not shown) to a run stack 460.

The input stack 458, the run stack 460, and the save buffer 464 may be referred to herein as an input stack, run stack, and save stack, respectively, although the input stack 458, run stack 460, and save stack 464 may or may not exhibit the Last In First Out (LIFO) properties of a stack. The input stack 458, run stack 460, and save buffer 464 may be located within a same or different physical buffer. If located within the same physical buffer, entries of the input stack 458, run stack 460, and save buffer 464 may be differentiated based on a field setting of the entries, or differentiated in any other suitable manner. The input stack 458 and the run stack 460 may be located in the same physical buffer that may be on-chip and the save buffer 464 may be located in another physical buffer that may be off-chip.

The at least one job, such as S1 459a, S2 459b, or S3 459c, of the at least one instruction 453, may be stored in the input stack 458 for processing by the HNA 108. The at least one job of the at least one instruction may each belong to a same given payload, such as the payload 462, that was processed by the HFA 110.

The HNA 108 may be configured to load (i.e., fetch or retrieve) at least one job from the input stack 458, such as jobs S1 459a, S2 459b, or S3 459c, based on the input stack pointer. The HNA 108 may push (i.e., store) the at least one job to the run stack 460. The HNA 108 may pop (i.e., read, fetch, load, etc.) a given job from the run stack, such as entry S1 459a, S2 459b, or S3 459c, and process the given job. Each at least one job (e.g., S1 459a, S2 459b, or S3 459c) may include a payload offset (not shown) to a segment (not shown) of the payload 462, and a pointer to a graph 457, that may be a given finite automata of at least one finite automata, such as the at least one NFA 314 of FIG. 3.

The HNA 108 may load (i.e., fetch) the graph 457 from the graph memory 456 that may be included in a binary image, such as the binary image 112 of FIG. 1 and FIG. 3, and begin processing the graph 457 using payload segments corresponding with respective payload offsets of the payload 462. The HNA 108 may process the graph 457, by walking nodes of the graph 457 with payload segments. A partially matching path of the graph 457 may include at least two nodes of the graph 457 that match consecutive segments of the payload to a given pattern used to generate the graph 457. The partially matching path may be referred to herein as a thread or an active thread.

The HNA 108 may process the graph 457 using payload segments from the payload 462, pushing and popping entries to/from the run stack 460 to save and resume its place in the graph 457. For example, the HNA 108 may need to save its place in the graph if a walked node presents multiple options for a next node to walk. For example, the HNA 108 may walk a node that presents multiple processing path options, such as a fork represented in the graph. According to embodiments disclosed herein, nodes of a DFA or NFA may be associated with a node type. Nodes associated with a split or variable count node type may present multiple processing path options. The split and variable count node types are further disclosed below in reference to FIG. 5A and FIG. 6A.

According to embodiments disclosed herein, the HNA 108 may be configured to select a given path, of the multiple processing paths, and push an entry to the run stack 460 that may enable the HNA 108 to return and proceed along the unselected path, of the multiple processing paths, based on determining a mismatch (i.e., negative) result at walked node along the selected path. As such, pushing the entry on the run stack 460 may save a place in the graph 457 that represents unexplored context. The unexplored context may indicate a given node of the graph 457 and a corresponding payload offset to enable the HNA 108 to return to the given node and walk the given node with the given segment of the payload 462, as the given segment may be located at the corresponding payload offset in the payload 462.

As such, the run stack 460 may be used to enable the HNA 108 to remember and later walk an unexplored path of the graph 457. Pushing or storing an entry that indicates a given node and a corresponding offset in a given payload may be referred to herein as storing an unexplored context, thread or inactive thread. Popping, fetching, or loading an entry that indicates the given node and the corresponding offset in the given payload in order to walk the given node with a segment located at the corresponding offset in the given payload may be referred to herein as activating a thread or activating an inactive thread. Discarding an entry that indicates the given node and the corresponding offset in the given payload may be referred to herein as flushing an entry, retiring a thread, or retiring an inactive thread.

The run stack 460 may enable the HNA 108 to save its place in the graph 457 in an event that an end of the payload 462 is reached while walking segments of the payload 462 with the graph 457. For example, the HNA 108 may determine that the payload or a portion of the payload 462 is partially matching a given pattern and that a current payload offset of the payload 462 is an end offset of the payload 462. As such, the HNA 108 may determine that only a partial match of the given pattern was found and that the entire payload 462 was processed. As such, the HNA 108 may save the run stack 460 content to the save buffer 464 to continue a walk with a next payload corresponding to a same flow as the payload 462 that was processed. The save buffer 464 may be configured to store at least one run stack entry of the run stack 460, mirroring a running state of the run stack 460 in an event the entire payload 462 is processed.

Based on finding a final (i.e., entire or complete) match of the pattern, the HNA may pop and discard entries in the run stack 460 that are associated with the current job, for example the job loaded from the input stack, such as S1 459a, and save match results (not shown) to the match results buffer 466. Alternatively, the HNA 108 may continue processing entries of the run stack 460 that are associated with the current job as all possible matching paths may be of interest.

The match results may include a node address associated with a node at which the final match of the pattern was determined. The node at which the final match of the pattern was determined may be referred to herein as a marked node. The node address, or other identifier of a final match location in the graph 457, identifier of the matching pattern, length of the matching pattern, or any other suitable match results or a combination thereof, may be included in the match results.

Based on processing all of the run stack entries associated with the current job, the HNA 108 may load a next job from the run stack that has been previously loaded from the input stack 458 (e.g., S2 459b), as the HNA 108 may be configured to process jobs of the instruction 453 sequentially. As such, the HNA 108 may fetch a next graph (not shown) from the graph memory 456 walk the next graph with one or more payload segments from the payload 462 identified by the next job, and continue to process additional jobs until the run stack 460 is empty.

Based on finding a mismatch of the payload 462 while walking the graph 457 with the payload 462, the HNA 108 may pop an entry from the run stack 460 that is associated with the current job (e.g., S1 459a) and walk a next node with a next segment of the payload 462 based on content of the entry popped. If the run stack 460 does not include an entry associated with the current job, the HNA 108 may be done with the current job and may load a next job from the run stack 460 that has been previously loaded from the input stack 458 (e.g., S2 459b). As such, the HNA 108 may be configured to walk a next graph based on the next job loaded, and continue to process additional jobs until the run stack 460 is empty.

Figure 5A:
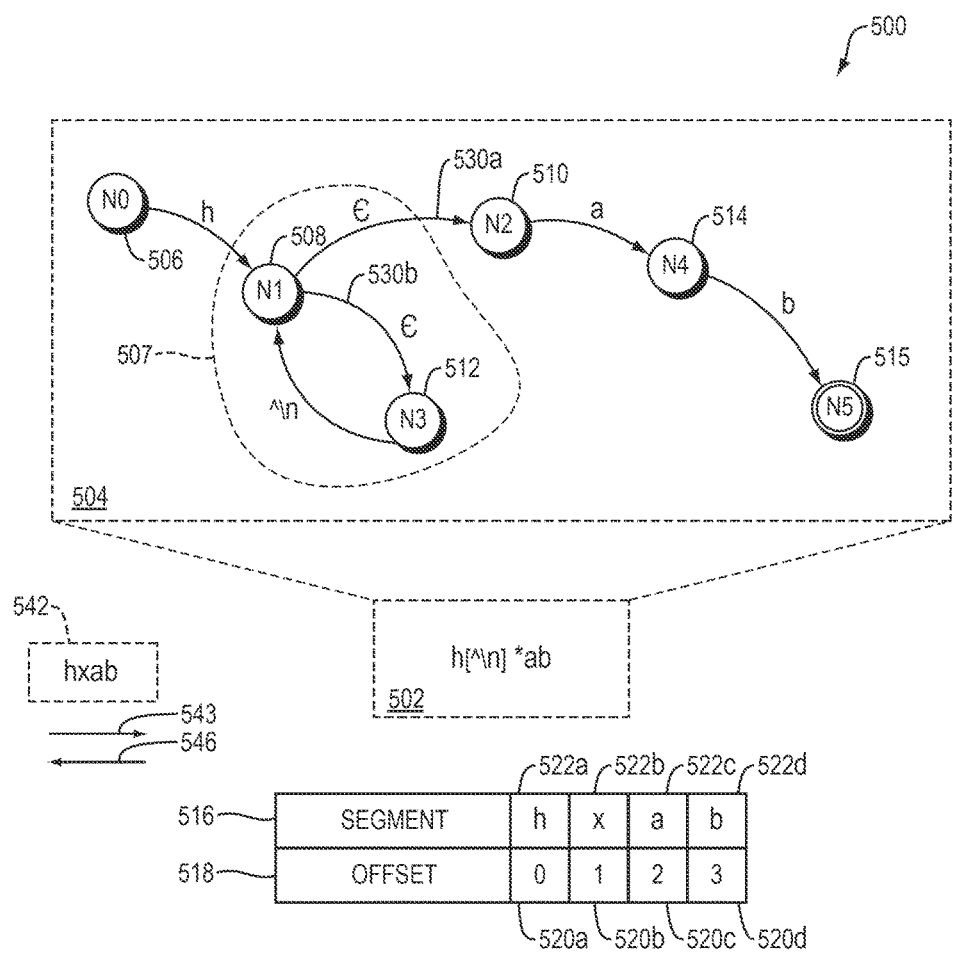
FIG. 5A is a block diagram of an example embodiment of non-deterministic finite automata (NFA) graph that may be used by a walker to match a regular expression pattern in an input stream.

FIG. 5A is a block diagram 500 of an example embodiment an NFA graph 504 that may be used by the walker 320 to match a regular expression pattern 502 in an input stream (not shown). As disclosed above, the HNA 108 may be configured to implement functionality of the walker 320 with respect to NFA processing.

In the example embodiment, the input stream may include a packet (not shown) with a payload 542. The regular expression pattern 502 is a pattern "h[^\n]*ab" that specifies the character "h" followed by an unlimited number of consecutive characters not matching a newline character (i.e., [^\n]*). The unlimited number may be zero or more. The pattern 502 further includes the characters "a" and "b" consecutively following the unlimited number of characters not matching the newline character. In the example embodiment, the payload 542 includes segments 522a-d (i.e., h, x, a, and, b), with respective offsets 520a-d (i.e., 0, 1, 2, and 3) in the payload 542.

It should be understood that the regular expression pattern 502, NFA graph 504, payload 542, segments 522a-d, and offsets 520a-d represent examples used for illustrative purposes and that the system, methods, and corresponding apparatus disclosed herein may apply to any suitable regular expression pattern, NFA graph, payload, segments, and offsets. Further, it should be understood that the NFA graph 504 may be a sub-section of a larger NFA graph (not shown). In addition, the payload 542 may a portion of a larger payload (not shown) and the portion may be at the beginning, end, or any location of the larger payload, resulting in offsets different from those in the example embodiment.

In the example embodiment, the NFA graph 504 is configured to match the regular expression pattern 502 to the input stream. For example, the NFA graph 504 may be a graph including a plurality of nodes generated by the compiler 306, such as nodes N0 506, N1 508, N2 510, N3 512, N4 514, and N5 515. The node NO 506 may represent a starting node for the pattern 502, and the node N5 515 may represent a marked node for the pattern 502. The marked node N5 515 may be associated with an indicator that reflects a final (i.e., entire or complete) match of the pattern 502 matched to the input stream. As such, the walker 320 may determine that the pattern 502 is matching in the input stream based on traversing the marked node N5 515.

According to embodiments disclosed herein, the walker 320 may walk the segments 522a-d of the payload 542 one segment at a time through the NFA graph 504 to match the regular expression pattern 502 to the input stream. A given segment of the segments 516 for walking a given node may be determined based on its respective offset of the offsets 518 being a current offset within the payload 542. According to embodiments disclosed herein, the walker 320 may update the current offset by incrementing or decrement the current offset. For example, the walker 320 may walk the NFA graph 504 in a forward or reverse direction, and, thus, may walk segments from the payload 542 in a forward 543 or a reverse 546 direction, by respectively incrementing or decrementing the current offset.

The nodes N0 506, N2 510, N3 512, and N4 514, may be configured to match a respective element to a given segment of the payload 542, whereas nodes N1 508 and N5 515 may be nodes of a node type indicating no matching functionality, and, thus, would not process from the payload 542. In the example embodiment, node N1 508 is a split node presenting multiple transition path options to the walker 320. For example, walking the split node N1 508 presents epsilon paths 530a and 530b. According to embodiments disclosed herein, the walker 320 may select a given path of the multiple paths 530a and 530b based on an implicit setting that is in mutual agreement with the walker 320. For example, the compiler 306 may generate the NFA graph 504 based on an implicit understanding that the walker 320 follows a deterministic path, for example, with the implicit understand that the walker 320 selects an upper epsilon path 530a based on walking the split node N1 508. According to embodiment disclosed herein, the upper epsilon path 530a may be selected as the upper epsilon path 530a represents a lazy path. The lazy path may be the path representing the shortest possible match of elements.

According to embodiments disclosed herein, the split node 508 may be associated with split node metadata (not shown) to present the multiple path options. For example, the split node metadata may indicate, either directly or indirectly, multiple next nodes, such as the nodes N2 510 and N3 512, in the example embodiment. If the multiple next nodes are indicated directly, the metadata may include absolute addresses or pointers to the next nodes N2 510 and N3 512. If the multiple next nodes are indicated indirectly, the metadata may include indices or offsets that may be used to resolve absolute addresses for or pointers to the next nodes N2 510 and N3 512. Alternatively, other suitable forms for directly or indirectly indicating the multiple next nodes may be used.

The implicit understanding may include configuring the walker 320 to select a given next node of multiple next nodes based on node metadata included in a particular entry location within the split node metadata. The compiler 306 may be configured to generate the split node metadata including an indication of the given next node at the designated entry location. As such, the implicit understanding that a given path, such as the upper epsilon path 530a, will be selected by the walker 320 at the split node N1 508 may be used by the compiler 306 generating the NFA graph 504.

Figure 5B:
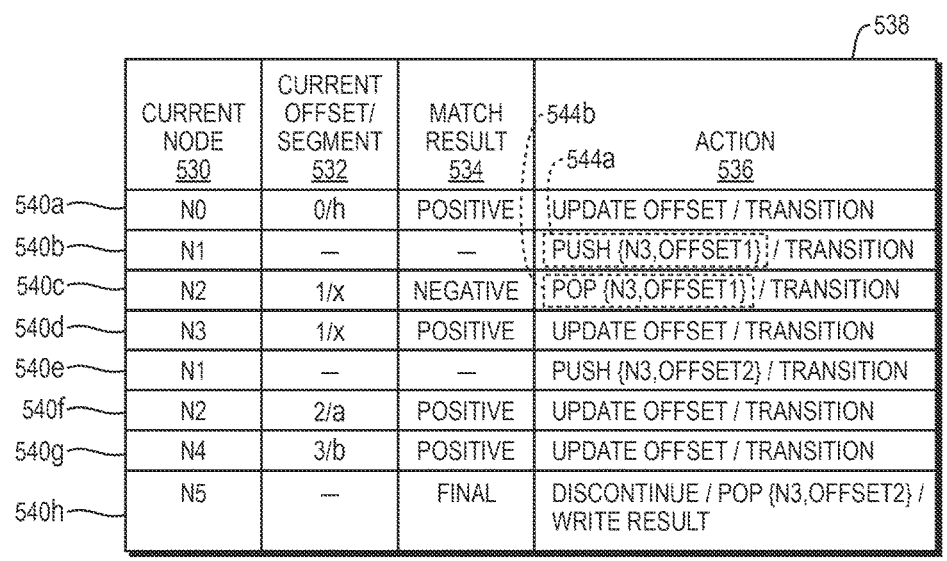
FIG. 5B is a table of an example embodiment of processing cycles for walking the NFA graph of FIG. 5A with a payload.

FIG. 5B is a table 538 of an example embodiment of processing cycles for walking the NFA graph of FIG. 5A with a payload 542. It should be understood that a processing cycle may include one or more clock cycles.

As shown in the table 538, the processing cycles 540a-h may include walking a current node 530 with a segment from the payload 542 at a current offset 532 to determine a match result 534 and walker action 536 based on the match result 534. In the example embodiment, the node N0 506 may have a character node type. For example, the node N0 506 may be a character node that is configured to match the character "h" in the input stream. In the example embodiment, the walker 320 may walk the starting node N0 506 with the segment 522a (i.e., "h") at the current offset 520a in the processing cycle 540a.

The walker 320 may determine that the match result 534 is a positive match result as the segment 522a matches character "h" at the node N0 506. As specified by the compiler 306 via metadata (not shown) associated with the starting node N0 506, the walker 320 may walk in a forward direction and fetch the next node indicated by the metadata associated with the node N0 506 and may increment the current offset from 520a (i.e., "0") to 520b (i.e., "1"). The next node indicated by the node N0 506 is the split node N1 508 in the example embodiment. As such, the walker 320 takes the action 536 for the processing cycle 540a that includes updating the current offset to "1" in the payload 542 and transitioning to the split node N1 508. Transitioning may include fetching (also referred to herein as loading) the split node N1 508.

As the split node N1 508 presents multiple transition path options, such as the epsilon paths 530a and 530b, the action 536 for the processing cycle 540b may include selecting the upper epsilon path 530a and fetching the node N2 510 independent of the payload 542 and without consuming (i.e., processing) from the payload 542. Since no matching function is performed by the split node N1 508, the current offset/segment 532 are unchanged, and, thus, payload is not processed for the processing cycle 540b.

Since the split node N1 508 presents multiple path options, the action 536 may include storing unexplored context, such as by storing an indirect or direct identifier of the node N3 512 and the current offset 520b (i.e., "1"). The selected transition path may be referred to herein as the current or active thread and each untraversed transition path that is stored may be referred to herein as a stored thread. Each thread may be identified by a corresponding node identifier and offset in a payload. As such, the unexplored context may identify an unexplored thread (i.e., path).

Storing the unexplored context may enable the walker 320 to remember to return to the node N3 512 to walk the node N3 512 with the segment "1" at the offset 520b in the payload 542 in an event a negative match result occurs along the selected partially matching path, for example, if the negative match result is determined at the node N2 510 or nodes along a path extending from the node N2 510. According to embodiments disclosed herein, the unexplored context may be marked with a Discard Unexplored Processing (DUP) indicator that indicates to the walker 320 whether to discard or process the unexplored context in an event a final match for the pattern 502 is identified along the selected transition path.

For example, based on reaching the marked node N5 515 that indicates the final (i.e., complete or entire) match for the pattern 502 in the input stream, the walker 320 may utilize the DUP indicator to determine whether to process the unexplored context by walking the node N3 512 with the segment "x" at the offset 520b in an effort to determine another path of the NFA graph 504 that matches the pattern 502, or whether to discard the unexplored context. Marking the unexplored context with the DUP indicator may include marking the unexplored context in any suitable manner, such as by setting a bit or field associated with the unexplored context to true, to signify desired processing of the stack entry, or false to signify a desired discard of the stack entry.

Whether or not a stored thread is traversed may be determined by the compiler 306. For example, the compiler 306 may control whether or not the DUP indicator is set by configuring a setting in corresponding metadata for each node. Alternatively, the compiler 306 may configure a global setting included in global metadata associated with the finite automata, specifying that all stored threads are to be traversed, enabling all possible matches to be identified.

In the example embodiment, the selection of the epsilon transition path 530a may result in detecting a match failure at the node N2 510 or at a subsequent node, such as N4 514, of the current thread. As such, if a match failure is detected, the stored thread for the epsilon transition path 530b may then be traversed. Alternatively, if specified by the compiler 306, the epsilon transition path 530b may be traversed regardless of whether or not traversing the epsilon transition path 530b results detection of a match failure.

Storing the untraversed transition path may include pushing an entry on a stack, such as the run stack 460 of FIG. 4, by storing an identifier of the next node N3 513 in association with an indication of the current offset 520b in the entry. The identifier of the next node N3 513 may be a value, pointer, or any other suitable indicator of the next node. The value of the offset may be a numeric value, pointer, or any other suitable value identifying locations of segments 516 within the payload 542.

According to the example embodiment, based on selecting the upper path (i.e., the epsilon transition path 530a) the walker 320 may fetch node the N2 510 and try to match the segment 522b (i.e., "x") at the current offset 520b (i.e., "1") to the element "a" of the node N2 510 in the processing cycle 540c. Since "x" does not match element "a" at the node N2 510, the action 536 for the processing cycle 540c may include popping an entry from the run stack 460. The entry popped 544b may be a most recently popped entry, such as a stored entry 544a indicating the node N3 512 and offset 520b (i.e., "1") in the example embodiment.

The walker 320 may transition and walk the node N3 512 and with the segment "x" located at the offset 520b in the payload 542. As such, the processing cycle 540d shows the match result 534 is positive for processing cycle 540d. The action 536 for the processing cycle 540d may include updating the current offset to the offset 520c and transitioning back to the split node N1 508 that may be a next node indicated by the node N3 512.

Since all arcs transitioning from the split node N1 508 are epsilon transitions, the walker 320 may again select a path of the multiple path options and does not consume (i.e., process) from the payload 542 as the current offset is not updated for the processing cycle 540e. In the example embodiment, the walker 320 again selects the epsilon transition path 530a. As such, the walker 320 again stores a thread by pushing node N3 512 and the current offset, now 520c (i.e., "2"), on the run stack 460. As shown for processing cycle 540f, the walker 320 fetches node N2 510 and matches the segment 522c (i.e., "a") at offset 520c (i.e., "2") to the element "a" of the node N2 510. Since "a" matches at the node N2 510, the walker 320 updates the current offset to 520d (i.e., "3") and transitions to the node N4 514 that is specified by the node N2 510 metadata as configured by the compiler 306.

As such, for the processing cycle 540g, the walker 320 may fetch the next node N4 514 and the next segment 522d (i.e., "b") at the offset 520d. Since "b" matches at the node N4 514, the walker 320 may transition to the next node N5 515. The node N5 515 is a marked node associated with an indicator signifying a final (i.e., complete or entire) match of the regular expression pattern 502 in the input stream. Thus, for the processing cycle 540h the walker 320 may discontinue the walk along the current path and report the final match by storing an entry in the match result buffer 466. The walker 320 may then check the run stack 460 for stored threads and either discard the stored threads or activate them as indicated by the corresponding DUP indicator. As such, the walker 320 pops the entry that identifies the node N3 512 and the offset 520 (i.e., "2"), and determines whether to activate the stored thread by walking the node N3 512 with the segment 522c at the offset 520c or discard the stored thread according to the DUP indicator associated with the popped entry.

Figure 6A:
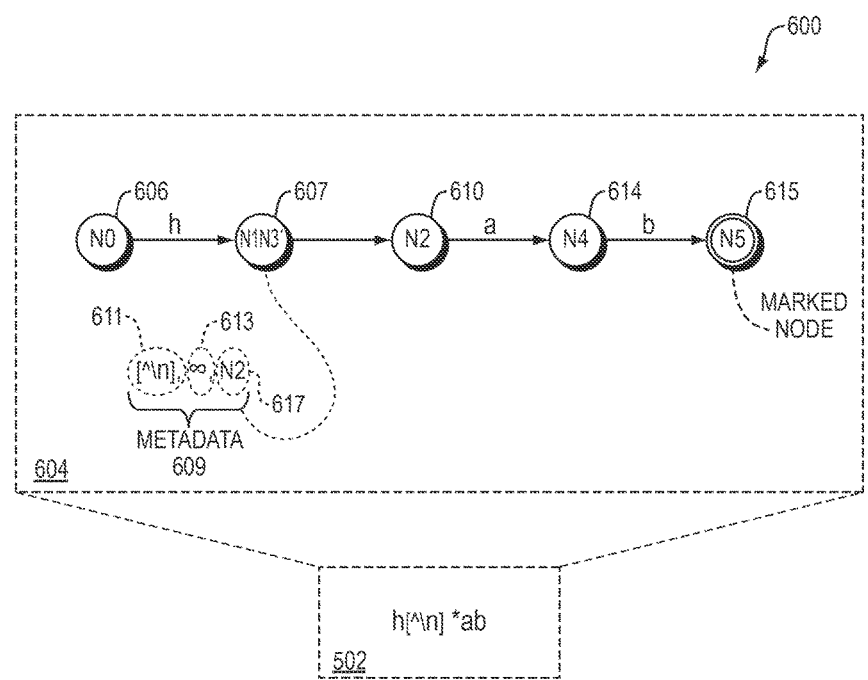
FIG. 6A is a block diagram of another example embodiment of an NFA graph that may be used by the walker to match the regular expression pattern in the input stream.

FIG. 6A is a block diagram 600 of another example embodiment of an NFA graph 604 that may be used by the walker 320 to match the regular expression pattern 502 of FIG. 5A in the input stream. In the example embodiment, a section 507 of FIG. 5A, including the node N1 508, the node N3 512, and epsilon transition paths 530a and 530b, is represented by a variable count node N1N3' 607. The variable count node N1N3' 607 is an aggregation of the node N1 508 and the node N3 512 of FIG. 5A.

According to embodiments disclosed herein, the variable count node N1N3' 607 may be configured to identify a given element, such as the character class 611 (i.e., rnp, a variable number of instances 613, such as infinite, as indicated by the variable count node. The variable number of instances 613 may be at least zero times or any other suitable number of instances. It should be understood that the given element character class 611 is for illustrative purposes of the example embodiment and that the given element may be any suitable element being matched by the variable count node N1N3'.

A variable count node is a node that may match an element a variable number of times, the number of times may be defined by a range (e.g., zero to five times). A variable count node may be one of four types of variable count nodes: a lazy, greedy, possessive, or all match node. The variable count lazy node may be configured to find a shortest possible match of elements within the range. A variable count greedy or possessive node may be configured to find the longest possible match of elements within the range. A variable count all match node may be configured to return all matches in the payload.

The variable count lazy node may be configured to process (i.e., consume) a single instance of a segment from the payload based on a mismatch of a segment at a next node identified by metadata associated with the variable count lazy node. The variable count greedy node may be configured to process consecutive segments from the payload until a mismatch of one of the consecutive segments is determined at the variable count greedy node or until the variable count greedy node has processed (i.e., consumed) the total number of the variable number of consecutive segments.

In the example embodiment of FIG. 6A, the variable count node N1N3' 607 is a variable count lazy node associated with metadata 609 identifying, either directly or indirectly, a next node 617, such as the element node N2 610. In the example embodiment, the walker advances the walk to the element node N2 610, based on zero or more matching instances, of the variable number of consecutive instances 613, of the given element 611 in the input stream. For example, in the example embodiment, the variable count lazy node N1N3' 607 is configured to match zero or more instances of the character class element "^\n" (i.e., not a newline character) an infinite number of times.

According to embodiments disclosed herein, each node of the NFA may be associated with metadata that includes at least four fields, such as a node type, element, count, and next node, although one or more of the at least four fields may not be applicable based on the node type.

The metadata 609 associated with the variable count lazy node N1N3' 607 may include a count (not shown) for tracking a total number (not shown) of consecutive instances of the element 611 positively matching in the payload to enable a comparison of the total number to the variable number 613.

FIG. 6B is a table 618 of an example embodiment of processing cycles 628a-g for traversing the NFA graph 604 of FIG. 6A with the payload 542. Similar to the embodiments of FIG. 5A and FIG. 5B, disclosed above, the walker 320 may walk the starting node N0 606 with the segment 522a (i.e., "h") at the current offset 520a (i.e., "0"). The walker 320 may determine that the match result 624 is a positive match result for the processing cycle 628a as the segment 522a matches character "h" at the node N0 606. In the example embodiment of FIG. 6A, a next node indicated by the node N0 606 is the variable count lazy node N1N3' 607. As such, the walker 320 takes the action 626 for the processing cycle 628a that includes updating the current offset to 520b (i.e., "1") in the payload 542 and transitioning to the variable count lazy node N1N3' 607. Transitioning may include fetching (also referred to herein as loading) the variable count lazy node N1N3' 607.

Since variable count lazy node N1N3' 607 is lazy, the action 626 for the processing cycle 628b may include storing the unexplored context, such as by storing an indirect or direct identifier of the node N1N3' 607 and the current offset 520b (i.e., "1") and advancing to the next node 617 identified by the variable count lazy node N1N3' 607 without updating the current offset. As such, no payload is processed by the variable count lazy node N1N3' 607 for the processing cycle 628a.

Storing the unexplored context may enable the walker 320 to remember to return to the variable count lazy node N1N3' 607 to walk the variable count lazy node N1N3' 607 with the segment "x" at the offset 520b in the payload 542 in an event a negative match result occurs along the selected partially matching path, for example, if the negative match result is determined at the node N2 610 or nodes along a path extending from node N2 610. To store the unexplored context, the walker 320 may push 630a an entry on the run stack 460 that includes an identifier for the variable count lazy node N1N3' 607 and the offset 520b.

According to embodiments disclosed herein, the unexplored context may be marked with the DUP indicator that indicates to the walker 320 whether to discard or process the pushed unexplored context in an event a final match for the pattern 502 is identified along the selected transition path. For example, based on reaching the marked node N5 615 that indicates the final (i.e., complete or entire) match for the pattern 502 in the input stream, the walker 320 may utilize the DUP indicator of the pushed stack entry to determine whether to process the unexplored context by walking the variable count lazy node N1N3' 607 with the segment "x" at the offset 520b in an effort to determine another path of the NFA graph 604 that matches the pattern 502, or whether to discard the unexplored context as only a single matching path of the pattern 502 in the input stream is of interest.

According to the example embodiment of FIG. 6B, the walker 320 may fetch the node N2 610 and may try to match (i.e., search for) the segment 522b (i.e., "x") at the current offset 520b (i.e., "1") in the processing cycle 628c to the element "a" of the node N2 610. Since "x" does not match the element "a" at the node N2 610 the action 626 for the processing cycle 628c may include popping 630b an entry from the run stack 460. The entry popped may be a most recently popped entry, such as the recently pushed 630a entry indicating the variable count lazy node N1N3' 607 and the offset 520b (i.e., "1").

The walker 320 may transition and walk the variable count lazy node N1N3' 607 with the segment "x" located at offset 520b in the payload 542. Since "x" is not a newline character, "x" is a positive match at the variable count lazy node N1N3' 607 and the processing cycle 628d shows the match result 624 is positive for the processing cycle 528d. The action 618 for the processing cycle 528d may include updating the current offset to offset 520c and transitioning back to the element node N2 610 that may be the next node indicated by the metadata 609 associated with the variable count lazy node N1N3' 607.

As shown for processing cycle 628e, the walker 320 fetches the node N2 610 and compares the segment 522c (i.e., "a") at the offset 520c (i.e., "2"). Since "a" is a positive match at the element node N2 610, the walker 320 updates the current offset to 520d (i.e., "3") and transitions to the node N4 614.

As such, for the processing cycle 628f, the walker 320 may fetch the node N4 614 and the segment 522d (i.e., "b") at offset 520d. Since "b" is a positive match at the node N4 614, the walker 320 may transition to the node N5 615. The node N5 615 is a marked node associated with an indicator signifying a final (i.e., complete or entire) match of the regular expression pattern 502 in the input stream. Thus, for the processing cycle 628g, the walker 320 may discontinue the walk and report the final match by storing an entry in the match result buffer 466. The walker may then check the run stack 460 for stored threads and either discard the stored threads or activate them as indicated by the corresponding DUP indicator of the entries in the run stack 460.

As disclosed above, the variable count node is a node that may match an element a variable number of times, the number of times may be defined by a range (e.g., zero to five times) and may be associated with a node type, such as lazy or greedy. In contrast to the variable count node with the lazy node type (i.e., a variable count lazy node), that may be configured to find a shortest possible match of elements within the range, the variable count node with the greedy node type (i.e., a variable count greedy node) may be configured to find the longest possible match of elements within the range. For example, as disclosed above, the walker 320 may be configured to select the upper epsilon path 530a to find the shortest possible match of elements within the range. However, to find the longest possible match within the range, the walker 320 may be configured to select the lower epsilon path 530b as the lower epsilon path 530b represents a greedy path.

The compiler 306 may be configured to generate split node metadata that may enable the walker 320 to select the lower epsilon path 530b to effect selection of the greedy path. As such, the walker 320 may iteratively transition between the split node N1 508 and the node N3 512 to process consecutive segments from the input stream provided each of the consecutive segments positively matches at the node N3 512. Based on negatively matching a given segment of the consecutive segments, the walker 320 may transition to the element node N2 510 via the upper epsilon path 530a, as the greedy path may be configured to process consecutive segments from the payload until a segment mismatch is determined.

Figure 7:
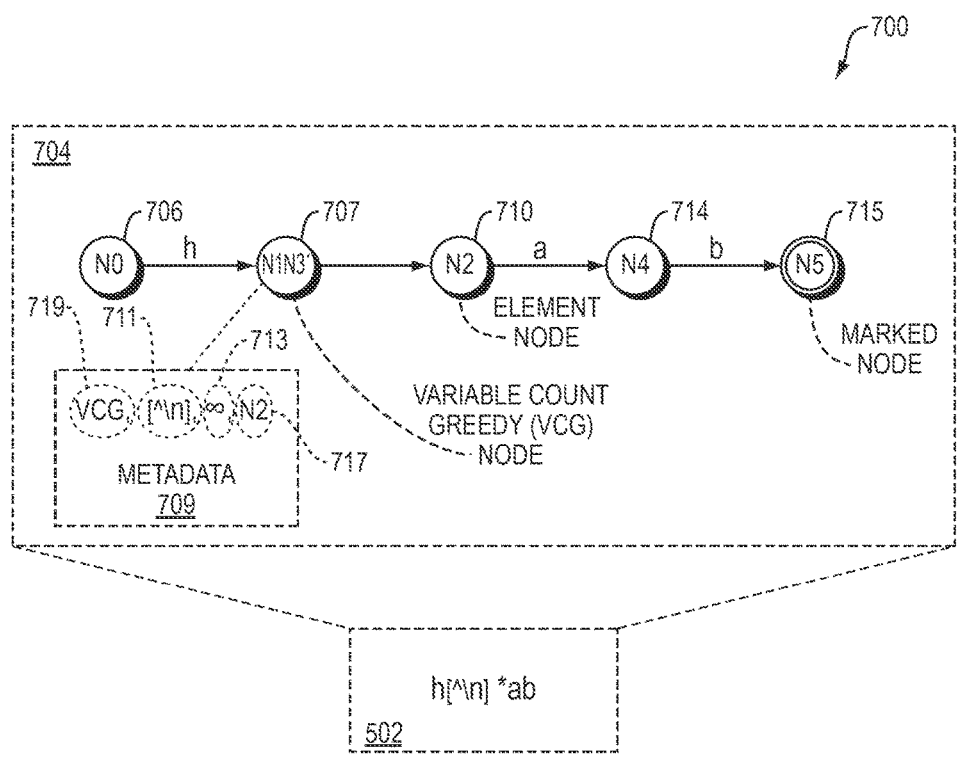
FIG. 7 is a block diagram of another example embodiment of an NFA graph that may be used by the walker to match the regular expression pattern in the input stream.

FIG. 7 is a block diagram 700 of another example embodiment of an NFA graph 704 that may be used by the walker 320 to match the regular expression pattern 502 in the input stream. In the example embodiment, the section 507 of FIG. 5A, including the split node N1 508, the node N3 512, and the epsilon transition paths 530a and 530b, is represented by a variable count node N1N3' 707. In contrast to the variable count lazy node N1N3' 607 of FIG. 6A, the variable count node N1N3' 707 is a variable count greedy node in the example embodiment. A node type 719 identifying the node N1N3' 707 as a variable count greedy node may be included in metadata 709 associated with the node N1N3' 707.

The variable count greedy node N1N3' 707 may be configured to process consecutive segments at the variable count greedy node N1N3' 707 until a segment mismatch (i.e., negative match) is determined or until the variable count greedy node has processed a threshold number of positively matching consecutive segments. The threshold number may be the upper value for a range of values associated with the variable count greedy node N1N3' 707.

According to embodiments disclosed herein, the variable count greedy node N1N3' 707 may be configured to identify a given element, such as the character class element 711 (i.e., [^\n]), a variable number of instances 713 as indicated by the metadata 709 associated with the variable count greedy node N1N3' 707. The variable number of instances 713 may be at least zero times or any other suitable number of instances, such as infinite in the example embodiment. It should be understood that the given character class element 711 and variable number of instances 713 are for illustrative purposes of the example embodiment and that the given element may be any suitable element being matched by the variable count greedy node N1N3' 707 the variable number of times 713.

In the example embodiment of FIG. 7, the metadata 709 associated with the variable count greedy node N1N3' 707 identifies, either directly or indirectly, a next node 717, such as the element node N2 710. In the example embodiment, the walker 320 may transition the walk to the element node N2 710, based on having positively matched the element 711 the variable number instances 713 in the input stream or based on a segment mismatch. For example, in the example embodiment, the variable count greedy node N1N3' 707 is configured to match an infinite number of consecutive instances of the character class element "^\n" (i.e., not a newline character) in the input stream. The metadata 709 associated with the variable count greedy node N1N3 707 may include a count value (not shown) for tracking a total number of consecutive instances of the element 711 positively matching in the payload to enable a comparison of the total number to the variable number 713. Since the variable number 713 is infinite in the example embodiment, the walker 320 may proceed to process consecutive segments from the input stream at the variable count greedy node N1N3' 707 until a newline character is processed. Optionally, a starting offset (not shown), indicating an earliest positively matching segment at the variable count greedy node N1N3' 707 may be also be included in the metadata 709 associated with the variable count greedy node N1N3' 707 and used in conjunction with the count value to determine a current offset in the payload.

Figure 8:
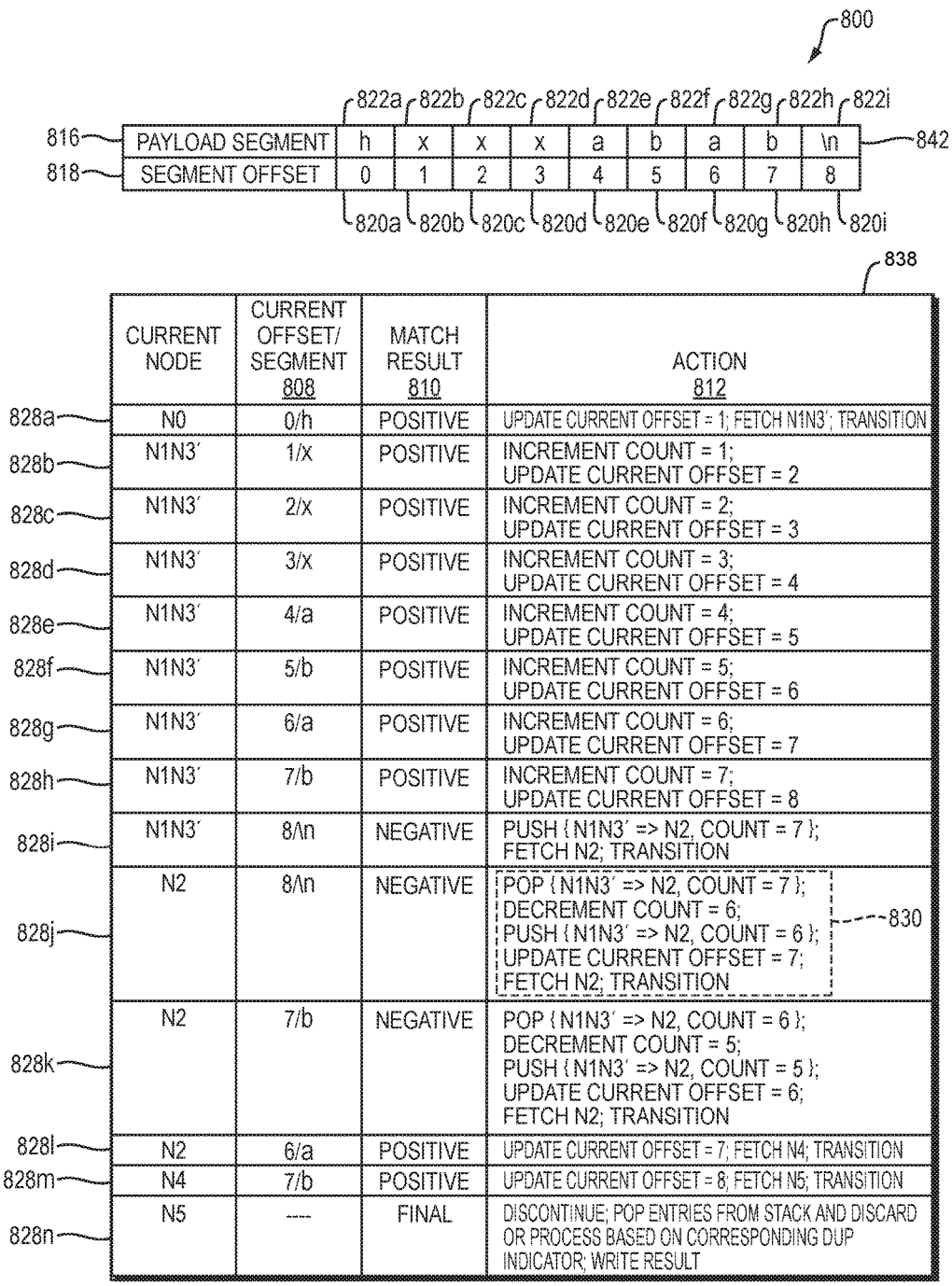
FIG. 8 is a block diagram of a payload and a table of an example embodiment of processing cycles for traversing the NFA graph of FIG. 7 with the payload.

FIG. 8 is a block diagram 800 of a payload 842 including payload segments 822*a-i* with respective segment offsets 820*a-i* and a table 838 of an example embodiment of processing cycles 828*a-n* for traversing the NFA graph 704 of FIG. 7 with the payload 842. The walker 320 may walk the starting node N0 706 with the segment 822*a* (i.e., "h") at the current offset 820*a* (i.e., "0"). The walker 320 may determine that the match result 810 is a positive match result for the processing cycle 828*a* as the segment 822*a* matches character "h" at the node N0 706. In the example embodiment of FIG. 7, a next node indicated by the node N0 706 is the variable count greedy node N1N3' 707. As such, the walker 320 may take the action 812 for the processing cycle 828*a* that includes updating the current offset to 820*b* (i.e., "1") in the payload 842 and fetching and transitioning to the variable count greedy node N1N3' 707 that is a next node for the N0 706.

Since the variable count greedy node N1N3' 707 is a greedy type node, the action 812 for the processing cycles 828*b-h* may include incrementing a count value included in the metadata 709 associated with the variable count greedy node N1N3' 707 in each of the processing cycles 828*b-h* to track a total number of consecutive segments that have been positively matched at the variable count greedy node N1N3' 707. The action 812 for the processing cycles 828*b-h* may further include updating the current offset to a next segment offset of the segment offsets 818 to process a next segment of the segments 816 as shown by the processing cycles 828*b-h*. Such incrementing of the count value and updating of the current offset may be repeated until a mismatch of the payload segment at the current offset 808 is determined, as is the case shown for processing cycle 828*i*.

As shown in the table 838, the segment 822*i* at the current offset 820*i* negatively matches at the variable count greedy node N1N3' 707 for the processing cycle 828*i*. According to embodiments disclosed herein, unexplored context such as an identifier of the next node N2 710 of the variable count greedy node N1N3' 707 may be stored in conjunction with the count value of the variable count greedy node N1N3' 707 and a DUP indicator that may be set to one.

Based on the negative match result 810 for the processing cycle 828*i*, the walker may fetch the next node indicated, either directly or indirectly, by the metadata 709 associated with the variable count greedy node N1N3' 707 and transition to the node N2 710 to walk the node N2 710 with the segment 822*i* having negatively matched at the variable count greedy node N1N3' 707, in an effort to find the longest possible match.

As shown for processing cycle 828*j*, the segment 822*i* has a match result 810 that is negative at the node N2 710 as the segment "\n" does not match the element "a" of the element node N2 710. As such, the walker 320 may proceed to incrementally unroll the consecutive segments having previously positively matched at the variable count greedy node N1N3' 707. For example, the walker 320 may unroll segments 822*h* . . . 822*b*, in an effort to determine a most recently walked segment having positively matched at the variable count greedy node N1N3' 707 that also matches at the next node N2 710, in an effort to find the longest possible match. An unrolling action may include popping context stored that identifies the element node and a count of the number of positively matching consecutive segments matched at the variable count node prior to a segment mismatch. The unrolling action may include decrementing the count and pushing stored context identifying the element node and including the count decremented. The unrolling action may further include updating the current offset and fetching the element node.

As shown for processing cycle 828*k*, the segment 822*h* negatively matches at the element node N2 710 and the walker 320 takes the actions 812 shown, similar to the unrolling actions 830 of the processing cycle 828*j*, and, thus, proceeds to unroll by determining if the segment 822*g* matches at the element node N2 710 as shown for the processing cycle 828*l*. Since the segment 822*g* (i.e., "a") positively matches at the element node N2 710, the walker 320 may update the current offset and fetch the next node N4 714 that may be identified via metadata associated with the element node N2 710. The segment 822*h* may be positively matched at the node N4 714 as shown for processing cycle 828*m* and the walker 320 may update the current offset and fetch the next node N5 715 that may be identified via metadata associated with the element node N4 714.

The node N5 715 is a marked node associated with an indicator signifying a final (i.e., complete or entire) match of the regular expression pattern 842 in the input stream. Thus, for the processing cycle 828n, the walker 320 may discontinue the walk and report the final match by storing an entry in the match result buffer 466. The walker may then check the run stack 460 for stored threads and either discard the stored threads or activate them as indicated by the corresponding DUP indicator of the entries in the run stack 460.

Figure 9:
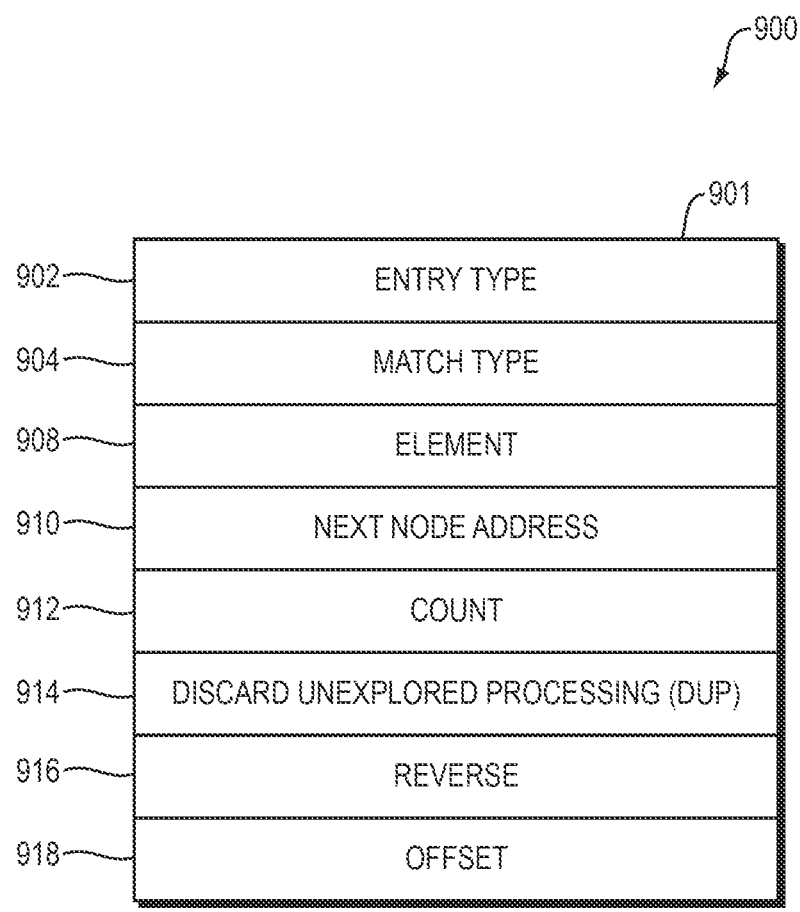
FIG. 9 is a block diagram of an example embodiment of context that may be stored or retrieved according to embodiments disclosed herein.

FIG. 9 is a block diagram 900 of an example embodiment of context 901 that may be stored or retrieved according to embodiments disclosed herein, such as by pushing or popping a stack entry. According to embodiments disclosed herein, the context 901 may include a plurality of fields 902-918. The plurality of fields may include a context entry type field 902 that may be based on a node type, such as the variable count node disclosed above, of a plurality of node types, such as the variable count node or element node types. The context entry type field 902 may signify which fields, of the plurality of fields 902-918 may be relevant for the node type.

The context 901 may further include a match type field 904 that that may be relevant based on the context entry type field 902. The match type field 904 may be based on the node type and may be used to determine whether a given node is configured to match a single instance or multiple consecutive instances of a given element in an input stream received from the network. For example the match type field 904 may indicate a lazy or greedy match type.

The context 901 may further include an element field 908 that may be relevant regardless of the context entry type field 902 and may identify the given element for matching at the given node.

The context 901 may further include a next node address field 910 that may be relevant regardless of the context entry type field and may identify a next node associated with the given node. For example, based on a positive match at the given node, the next node for walking a next segment may be identified via the next node address field 910.

The context 901 may further include a count field 912 that may be relevant based on the context entry type field 902. For example, if the context entry type field 902 indicates that the given node is a fixed count node then the count value may not be relevant whereas if the context entry type field indicates that the given node is a variable count lazy node or a variable count greedy (VCG) node then the count value may be relevant. The count field 912 may identify a count value for a number of consecutive instances remaining for positively matching the given element identified by the element field 908 at the given node, based on the context entry type field indicating the variable count lazy node type. Based on the context entry type field 902 indicating that the given node is a variable count greedy node (VCG) node, the count field may indicate a number of consecutive instances positively matched to the given element at the given node. For example, the count value such as the count value shown for the processing cycles 828b-h of FIG. 8.

The context 901 may further include a discard unexplored context (DUP) field 914 that may be relevant regardless of the context entry type field 902 and may identify whether to discard the context 901 or walk the next node identified by the next node address field 910, in an event a complete match of at least one regular expression is detected in the input stream.

The context 901 may further include a reverse walk direction field 916 that may be relevant regardless of the context entry type field 902 and may identify a reverse or forward direction of walking.

The context 901 may further include an offset field 918 that may be relevant regardless of the context entry type field 902 and may identify an offset of a segment of a payload in the input stream for matching to a particular element. The particular element may be identified based on the context entry type field 902. For example, based on the context entry type field 902 indicating a variable count lazy node, the offset field 918 may identify a segment of the payload for matching the given element identified by the element field 908 of the context 901. However, based on the context entry type field 902 indicating a variable count greedy node, the offset field 918 may identify a segment of the payload for matching with a next element, the next element identified via next metadata associated with the next node identified via the next node address field 910 of the context 901. The next metadata may be obtained based on fetching the next node via the next node address field 910.

As such, according to embodiments disclosed herein, pushing context may include configuring a stack entry that includes the context 901 and the stack entry may be stored on a stack such as the run stack 460 of FIG. 4 disclosed above. A first subset of the fields of the context 901 may be configured based on given metadata associated with the given node, obtained based on having previously fetched the given node, such as the match type field 904, the element field 908, and the next node address field 910 field. A second subset of the fields of the context 901 may be configured by the HNA 108 based on run time information for the walk, such as a current walk direction or count value being maintained for the given node. For example, the second subset may include the reverse walk direction field 916, the count field 912, and the discard unexplored context (DUP) field 914.

According to embodiments disclosed herein, the context 901 may be interpreted by the HNA 108 based on a context status setting (not shown) included in the context entry type field 902. The context status setting may indicate whether or not the context 901 is complete or incomplete. Based on the context status setting of the context entry type field 902 of the context 901 of a popped stack entry indicating that the context 1401 is incomplete, the HNA 108 may be configured to fetch the next node identified via the next node address field 910 and proceed with the walk based on metadata stored by the next node and current run time configuration, such as a direction of the walk, rather than proceeding with the walk based on field configuration of the context 901 of the popped stack entry.

Referring back to FIG. 4, the run stack 460 may be configured to store a context, such as a stack entry (also referred to interchangeably herein with context, search context, context entry, unexplored context, or an unexplored context entry), that may be pushed by the HNA 108 for walking a given node, of a plurality of nodes of a given finite automaton of at least one finite automaton. For example, as disclosed above with regard to FIG. 5A-FIG. 6B above, context may be pushed or popped for walking the given node. The context may identify the given node and an offset, of a segment in a payload of an input stream received from the network. The context may enable the HNA 108 to walk the given node identified via the context with the segment identified via the offset. As disclosed above, the HNA 108 may employ the run stack 460 to save context, such as the context 901 disclosed above, to save states of nodes of an NFA graph during a walk of the nodes of the NFA graph.

According to embodiments disclosed herein, the run stack 460 may be configured with multiple entries for storing multiple contexts. The run stack 460 may be maintained as a circular buffer, such as the circular buffer 481 of FIG. 4 that may have a corresponding head pointer 482 and tail pointer 484. The run stack 460 may be configured to store the head pointer 482 and the tail pointer 484. Accessing the run stack 460 to push a stack entry (i.e., context) may be based on the head pointer 482 stored.

For example, to push context (i.e., store context) the HNA 108 may be configured to decrement the head pointer 482 and store the context in an empty (i.e., un-processed) stack entry of the run stack 460. The empty stack entry may be addressed by the head pointer decremented. To pop (i.e., retrieve or read) a stack entry (i.e., context), the HNA 108 may be configured to retrieve the stack entry from a current stack entry location that is addressed by the head pointer 482 and the HNA 108 may update the head pointer 482 by incrementing the head pointer to address a next stack entry location immediately subsequent to the current stack entry location.

As such, addressing of the run stack 460 may increase from a previous pointer to a next pointer to pop (i.e., retrieve or read) a context entry. For example, to pop a stack entry the HNA 108 may read the stack entry at the head pointer and increment the head pointer to point to the next stack entry, whereas to push a stack entry the HNA 108 may decrement the head pointer and fill an entry designated (e.g., pointed to) by the decremented head pointer with a given context. Alternatively, to pop the stack entry the HNA 108 may read the stack entry at the head pointer and decrement the head pointer to point to the next stack entry, whereas to push a stack entry the HNA 108 may increment the head pointer and add the stack entry at the location pointed to by the incremented head pointer.

A host (not shown) may provide the initial HNA stacks with zero or more entries filled-in along with the at least one instruction 453. As disclosed above, the instruction queue 454 may be configured to store the at least one instruction 453 that may be sent by the host to be processed by the HNA 108. The at least one instruction 453 may include at least one job, such as S1 459a, S2 459b, or S3 459c, and may include stack related information, such as a stack head pointer, a stack tail pointer, a number of stack entries, and a stack buffer size.

Figure 10A:
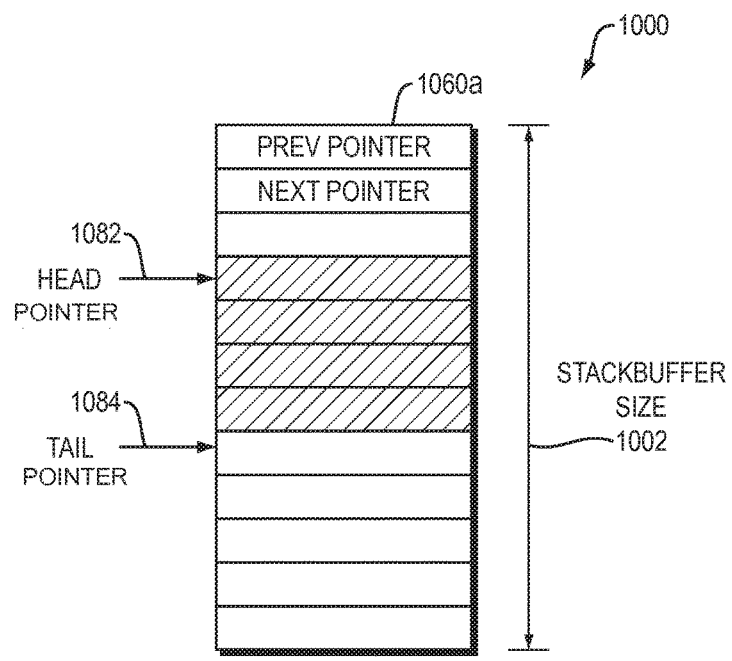
FIG. 10A is a block diagram of an example embodiment of a stack buffer and fields related thereto.

FIG. 10A is a block diagram 1000 of an example embodiment of a stack buffer 1060a, such as the run stack 460 of FIG. 4, and fields related thereto, such as the stack head pointer 1082, the stack tail pointer 1084, and the stackbuffer size 1002. According to embodiments disclosed herein, addressing may increase from the previous pointer to the next pointer, i.e., to pop a context entry the HNA 108 may read the context at the head pointer 1082 and increment the head pointer 1082 to point to the next context entry. To push the context entry the HNA 108 may decrement the head pointer 1082 and fill an entry designated (e.g., pointed to) by the updated head pointer with a context. As such, the run stack 460 may be implemented as a circular buffer with a LIFO characteristic.

Figure 10B:
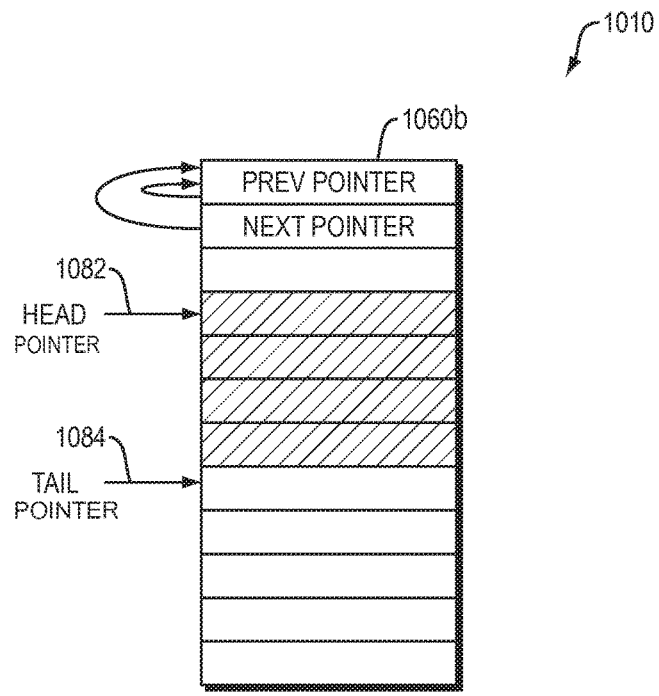
FIG. 10B is a block diagram of an example embodiment of the stack buffer of FIG. 10A that may be implemented as a single buffer that is configured as a circular buffer.

FIG. 10B is a block diagram 1010 of an example embodiment of the stack buffer 1060a of FIG. 10A that may be implemented as a single buffer 1060b that is configured as a circular buffer.

Figure 10C:
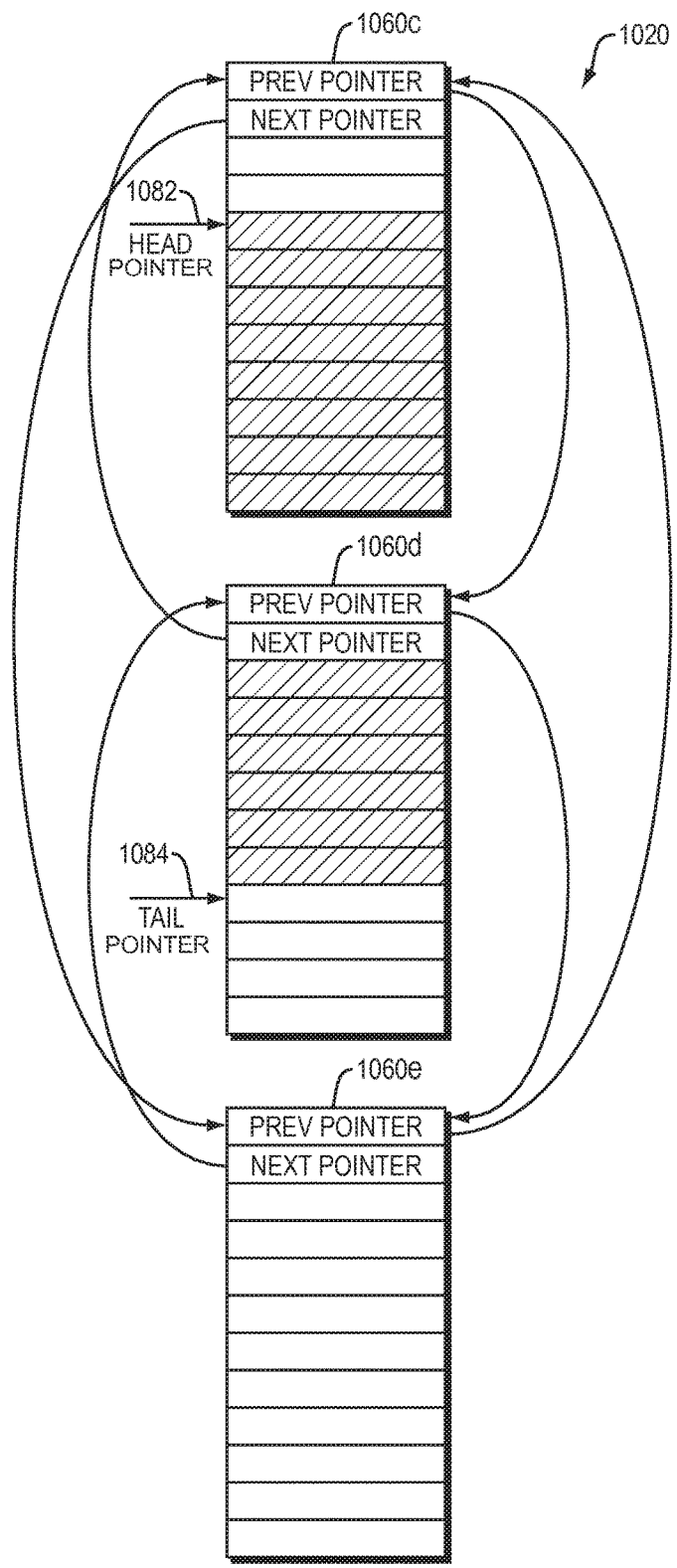
FIG. 10C is a block diagram of an example embodiment of the stack buffer of FIG. 10A that may be implemented as multiple buffers linked together as a circular buffer.

FIG. 10C is block diagram 1020 of an example embodiment of the stack buffer 1060a of FIG. 10A that may be implemented as multiple buffers 1060c-e linked together as a circular buffer.

According to embodiments disclosed herein, the run stack 460 may include a first set of context entries that may be located on-chip and a second set of context entries that may be located off-chip. As such, the run stack 460 may be understood as including an on-chip run stack as well as an off-chip run stack, wherein the on-chip run stack may be configured to store the first set of context entries and the off-chip run stack may be configured to store the second set of context entries. The on-chip run stack may be referred to herein as an "internal" run stack as the on-chip run stack may be co-located on a physical hardware chip that includes the HNA 108, whereas the off-chip run stack may be referred to herein as an "external" run stack as the off-chip run stack may be on a separate chip from the physical hardware chip that includes the HNA 108.

The HNA 108 may be operatively coupled to the on-chip run stack as well as the off-chip run stack. The off-chip run stack may be located in a system memory that may be external to the physical hardware chip that includes the HNA 108. The physical hardware chip that includes the HNA 108 may be a field-programmable gate array (FPGA), application-specific integrated circuit (ASIC), or any other suitable physical hardware chip. The on-chip run stack may be of a first finite size in accordance with a limited amount of real estate available on the physical hardware chip, whereas the off-chip run stack may be of a second finite size in accordance with an amount of physical memory external to the physical hardware chip that may be operatively coupled to the physical hardware chip.

The off-chip run stack may be a buffer located in system memory that may include one or more physical memory chips that may be shared by multiple physical hardware chips. The off-chip run stack may be configured to store earlier pushed context entries whereas the on-chip run stack may be configured to store more recently pushed context entries. The off-chip run stack may be understood as including context "spilled over" from the on-chip run stack, preventing context overflow of the on-chip run stack. It should be understood that context may refer to a single stack entry or multiple stack entries, each entry including one or more fields such as the context fields disclosed above with regard to FIG. 9. According to embodiments disclosed herein, context may be advantageously transferred between the on-chip run stack and the off-chip run stack to enable the HNA 108 to perform push or pop operations via on-chip memory accesses enabling relatively faster access times than off-chip memory accesses, thereby increasing overall search performance.

According to embodiments disclosed herein, the on-chip run stack may be a 256×64 bit buffer and the off-chip run stack may be located in double data rate synchronous dynamic random-access memory (DDR SDRAM). However, it should be understood that the on-chip run stack and the off-chip run stack may be of any suitably sized memory and may be of any suitable type of memory.

Figure 10D:
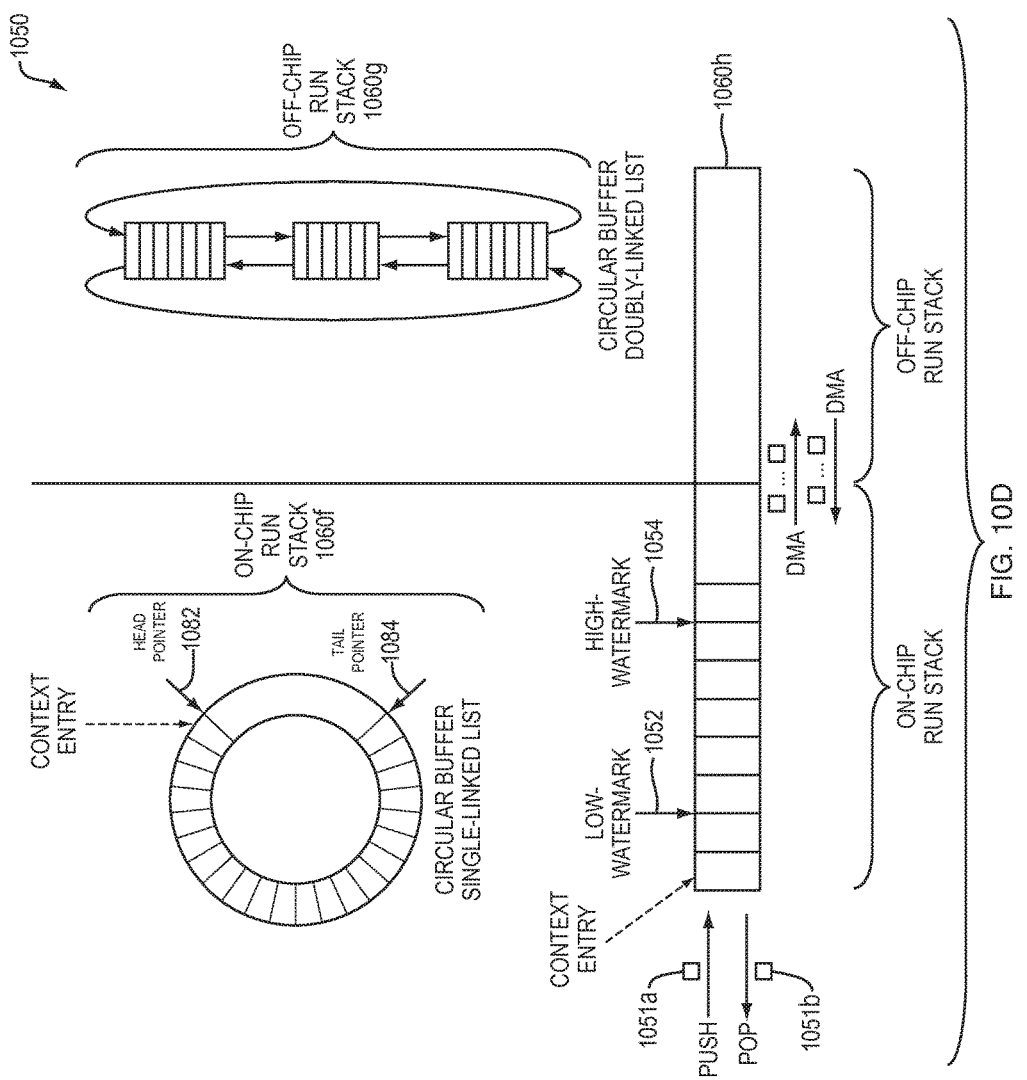
FIG. 10D is a block diagram of an example embodiment of the run stack of FIG. 4 that may include on-chip run stack and an off-chip run stack.

FIG. 10D is a block diagram 1050 of an example embodiment of the run stack 460 of FIG. 4 that may include an on-chip run stack 1060f and an off-chip run stack 1060g. According to embodiments disclosed herein, the on-chip run stack 1060f may be configured as a single-linked list circular buffer. The off-chip run stack 1060g may be configured as a doubly-linked list circular buffer. A run stack, such as the run stack 460 of FIG. 4, may be shown logically as a run stack 1060h that may include the on-chip run stack 1060f and the off-chip run stack 1060g.

According to embodiments disclosed herein, the on-chip run stack 1060f may be associated with a low-watermark 1052 and a high-watermark 1054 that may enable context to be transferred between the on-chip run stack 1060f and the off-chip run stack 1060g. Transferring context between the on-chip run stack 1060f and the off-chip run stack 1060g may include a direct memory access (DMA) or any other suitable mechanism for transferring context between the on-chip run stack 1060f and the off-chip run stack 1060g. The low watermark 1052 or the high watermark 1054 may be compared with a first total number of un-processed context entries residing in the on-chip run stack 1060f. A determination of whether to transfer context between the on-chip run stack 1060f and the off-chip run stack 1060g may be based on a respective comparison. The first total number of un-processed context entries may be determined based on a difference between the head pointer 1082 and the tail pointer 1084.

Embodiments disclosed herein may maintain a first set of context entries in the on-chip run stack 1060f and a second set of context entries in the off-chip run stack 1060g based on the low watermark 1052, the high watermark 1054, or a combination thereof. As such, the total context may be advantageously divided between the on-chip run stack 1060f and the off-chip run stack 1060g with regard to storage, enabling the HNA 108 to push a context 1051a or pop a context 1051b by accessing the on-chip run stack 1060f while ensuring that the on-chip run stack 1060f does not "run dry" of context or experience context overflow.

For example, the low watermark 1052 may be advantageously set to ensure that a pop operation to retrieve the context 1051b does not require an external access to the off-chip run stack 1060g that would otherwise result based on an empty state of the on-chip run stack 1060f (e.g., if the on-chip run stack 1060f does not include at least one un-processed context entry) and a non-empty state of the off-chip run stack 1060g (e.g., the off-chip run stack includes at least one un-processed context entry). Further, the low watermark 1052 and the high watermark 1054 may be configured in a manner that minimizes a number of transfer operations between the on-chip run stack 1060f and the off-chip run stack 1060g while ensuring that the on-chip run stack 1060f does not "run-dry" or overflow.

According to embodiments disclosed herein, if a push operation results in a crossing of the high watermark 1054, the HNA 108 may be configured to transfer a first number of context entries to the off-chip run stack 1060g. Further, if a pop operation results in the first total number of context entries stored in the on-chip run stack 1060f to cross the low watermark 1052, a second number of context entries may be transferred from the off-chip run stack 1060g to the on-chip run stack 1060f based on a second total number of un-processed context entries residing in the off-chip run stack 1060g.

For example, if the second number of un-processed context entries does reside in the off-chip run stack 1060g, the second number of un-processed context entries may be transferred from the off-chip run stack 1060g to the on-chip run stack 1060f. However, if the second total number of un-processed context entries residing in the off-chip run stack 1060g is less than the second number, the second total number of un-processed context entries residing in the off-chip run stack 1060g may be transferred to the on-chip run stack 1060f. Embodiments disclosed herein may con- figure the second number such that a margin (not shown) between the first total number of un-processed context entries stored in the on-chip run stack 1060f and the high watermark 1054 is maintained. The margin may be configured to prevent a next predetermined number of push operations to cause a subsequent transfer of context from the on-chip run stack 1060f back to the off-chip run stack 1060g.

Embodiments disclosed herein may enable context transfers between the on-chip run stack 1060f and the off-chip run stack 1060g to be advantageously performed such that push or pop operations of context are performed on the on-chip run stack 1060f in a manner that prevents access of the off-chip run stack 1060g from stalling the push or pop operation from the perspective of the HNA 108. According to embodiments disclosed herein, while a pop operation of the context 1051b may result in a transfer of context from the off-chip run stack 1060g to the on-chip run stack 1060f based on detection of a crossing of the low watermark 1052 due to the pop-operation, the transfer of context from the off-chip run stack 1060g to the on-chip run stack 1060f is a side-effect of the pop operation and, thus, does not affect execution time of the pop operation itself as the context popped is retrieved from the on-chip run stack 1060f.

Similarly, a push operation for pushing the context 1051a may result in a transfer of context from the on-chip run stack 1060f to the off-chip run stack 1060g based on detection of a crossing of the high watermark 1054 due to the push operation. However, execution time of the push operation itself is not affected by the context transfer as the context transfer is a side-effect of the push operation enabling the push operation to run to completion independent of whether or not context is transferred.

According to embodiments disclosed herein, the run stack 1060h may include the on-chip run stack 1060f and the off-chip run stack 1060g that may be implemented as circular buffers with a LIFO characteristic with regard to the pushing and popping of context entries by the HNA 108. As disclosed above, to pop the context entry 1051b the HNA 108 may read the context at the head pointer 1082 and increment the head pointer 1082 to point to a next context entry. To push the context entry 1051a the HNA 108 may decrement the head pointer 1082 and fill an entry designated (e.g., pointed to) by the updated head pointer with the context 1051a. As such, the push and pop operations to store and retrieve context may be based on the head pointer 1082 associated with the on-chip run stack 1060f.

According to embodiments disclosed herein, transfer of context between the on-chip run stack 1060f and the off-chip run stack 1060g may be based on the tail pointer 1084 associated with the on-chip run stack 1060f. Transfer of context from the on-chip run stack 1060f to the off-chip run stack 1060g may be referred to herein as an en-queue operation and transfer of context from the off-chip run stack 1060g to the on-chip run stack 1060f may be referred to herein as a de-queue operation. To en-queue a context entry, the HNA 108 may decrement the tail pointer 1084 and add one or more context entries from the on-chip run-stack 1060f to the off-chip run stack 1060. As such, the en-queue operation may "drain" an oldest (i.e., earliest pushed) context entry from the on-chip run stack 1060f or "spill over" the oldest context entry from the on-chip run stack 1060f to the off-chip run stack 1060g.

To transfer context from the off-chip run stack 1060g to the on-chip run stack 1060f, the HNA 108 may de-queue one or more context entries from the off-chip run stack 1060g that may be most recently en-queued entries and may add the one or more de-queued context entries to the on-chip run stack 1060f. The one or more de-queued entries may be de-queued starting from the location pointed to by the tail pointer 1084 and the tail pointer 1084 may be incremented for each location de-queued. According to embodiments disclosed herein, if the head pointer 1082 and the tail pointer 1084 are pointing to the same location, the on-chip run stack 1060f may be considered empty, and if the head pointer +1 is the tail pointer, the on-chip run stack 1060f may be considered full. The tail pointer may point to an empty location.

As disclosed above, the off-chip run stack 1060g may be configured as a doubly linked-list circular buffer. As such, the off-chip run stack 1060g may be configured with head and tail pointers as well as. It should be understood that together the on-chip run stack 1060f and the off-chip run stack 1060g enable the run stack 1060h to operate with the LIFO characteristic.

As disclosed above with regard to FIG. 4, the input stack 458, run stack 460, and save buffer 464 may be located within a same or different physical buffer. If located within the same physical buffer, entries of the input stack 458, run stack 460, and save buffer 464 may be differentiated based on a field setting of the entries, or differentiated in any other suitable manner.

Alternatively, the input stack 458 and the run stack 460 may be located in a same portion of memory that may be on-chip and the save buffer 464 may be located in another physical buffer that may be off-chip. The HNA 108 may perform push/pop operations on the run stack 460 and a save operation on the save buffer 464. For example, the HNA 108 may utilize the run stack 460 to maintain transient context entries during an NFA walk; however, if a payload boundary is detected, the HNA 108 may save the current entries on the run stack 460 to the save buffer 464. The entries saved to the save buffer 464 may be referred to herein as a historical search context that may include one or more stack entries that store context such as the context disclosed above with regard to FIG. 9.

According to embodiments disclosed herein, the HNA 108 may maintain a current running length of the run stack 460, i.e., a total number of context entries for the run stack 460. As disclosed above with regard to FIG. 10D, the HNA 108 may maintain the run stack 460 as a combination of an on-chip and off-chip buffer. For example, the HNA 108 may maintain an on-chip buffer portion of the run stack 460, such as the on-chip run stack 1060f, by maintaining a 256×64 bit sized on-chip buffer to reduce external memory write and read operations for push and pop operations, respectively. The HNA 108 may be configured to shuttle (i.e., transfer) context entries between the on-chip buffer, such as the on-chip run stack 1060f, and the off-chip buffer, such as the off-chip run stack 1060g, by using low and high watermarks associated with the on-chip buffer.

According to embodiments disclosed herein, the HNA 108 may clear the run stack 460 that may be implemented as a circular buffer by clearing the entries of the run stack 460 and setting the head and tail pointers to zero prior to walking the at least one NFA 314. The run stack 460 may subsequently be filled by the HNA 108 with context entries provided in the instruction word. As the walker 320 progresses along a given walk of a given NFA, context may be pushed and popped based on the head pointer of the run stack 460. As the head pointer moves in a forward direction approaching the tail pointer, the HNA 108 may perform a Direct Memory Access (DMA) to DMA stack entries from the on-chip run stack to the off-chip run stack, preventing context overflow, as disclosed above.

As the head pointer moves in backward direction approaching the tail pointer, more stack entries from the off-chip buffer may be moved back to the on-chip buffer. As disclosed with regard to FIG. 10D, two separate watermarks, such as the low-watermark 1052 and the high watermark 1054, may be maintained by the HNA 108 to advantageously transfer context stored in stack entries between the on-chip run stack 1060f and the off-chip run stack 1060g.

The HNA 108 may maintain the save buffer 464 that may include an on-chip save buffer, that may be of 32×64 bits in length, or any other suitable length, and a portion of an external memory to flush the stack entries from the run stack 460 that may need to be saved if a match of a regular expression pattern is spread across multiple packets. In contrast to the run stack 460 that may be have a LIFO characteristic, the save buffer 464 may have a first-in-first-out (FIFO) characteristic.

Embodiments disclosed herein may enable optimized match performance due to the combined DFA and NFA type processing disclosed above. For example, embodiments disclosed above may reduce a number of false positives in NFA processing as the NFA processing may be based on partial matches identified via the DFA processing. Further, because embodiments disclosed herein include per-rule (i.e., per-pattern) NFAs that may be identified by the DFA processing, embodiments disclosed herein further optimize match performance. According to embodiments disclosed herein, the HFA 110 may generate one or more subpattern search contexts based on the partial matches identified via the DFA processing. The one or more subpattern search contexts may be stored in the input stack 458 for NFA processing by the HNA 108 to advance the search processing to determine whether the partial matches identified by the DFA processing are true positives or false positives based on whether a final match of the regular expression is identified in the input stream.

As disclosed above, the DFA 312 is a unified DFA and each at least one NFA 314 is a per-pattern (per-rule) NFA. Walking payload through the unified DFA 312 by the HFA 110 may be considered a first parsing block that marks starting points of patterns (intermediate matches) and provides the starting point to the at least one NFA 314 that may continue the walk from the mark to determine a final match. For example, based on the partial match results determined by processing segments of payloads of an input stream through the unified DFA 312, the walker 320 may determine that a given number of rules (i.e., patterns) of the rule set 310 need to be processed further, and the HFA 110 may produce pattern match results that may be converted into the given number of NFA walks as each at least one NFA 314 is a per-pattern NFA. The starting points provided for each NFA walk may be included in the subpattern search contexts in the input stack 458. The subpattern search contexts may include fields as disclosed above with regard to FIG. 9.

Figure 11A:
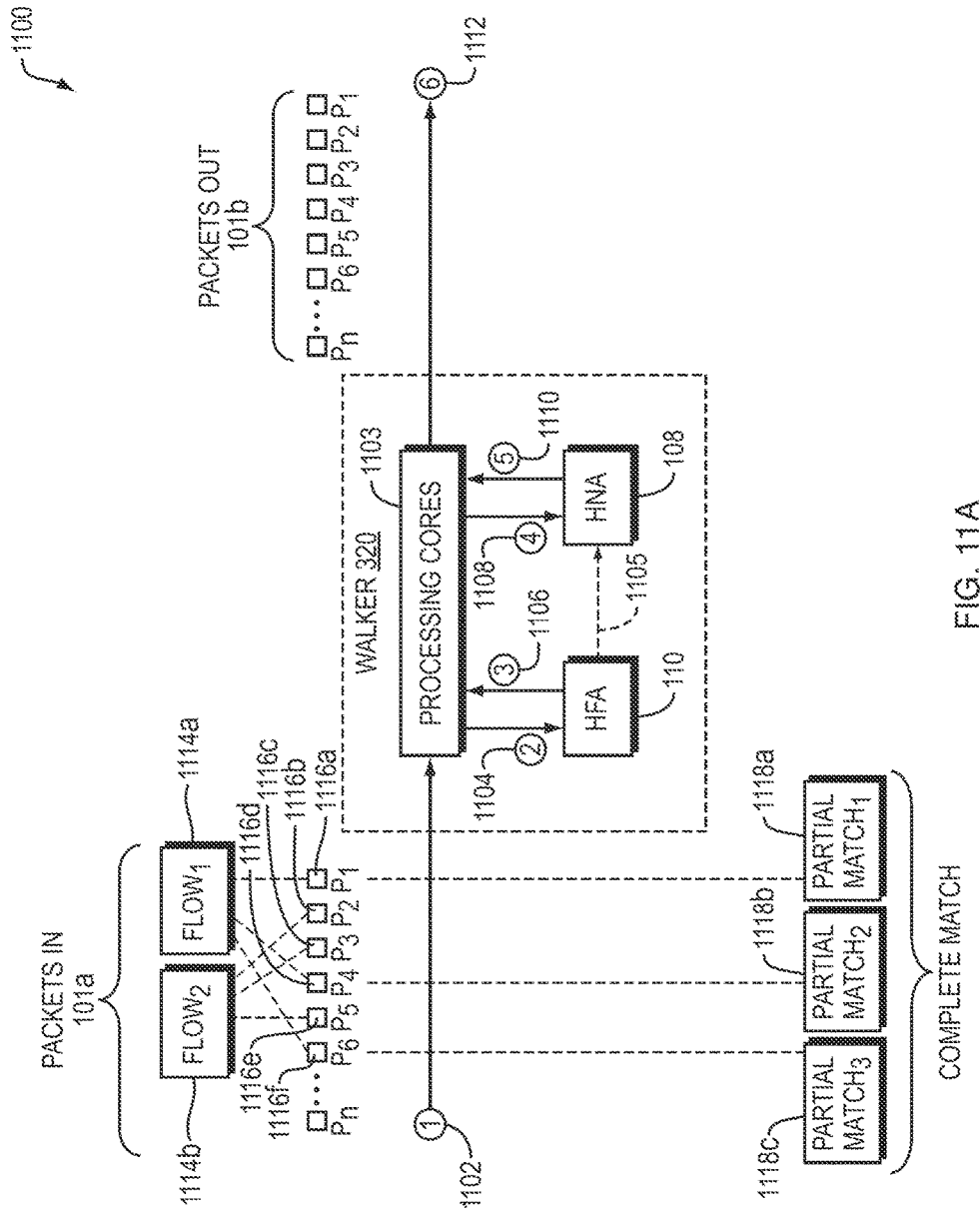
FIG. 11A is a block diagram of an example embodiment of an environment for the walker.

FIG. 11A is a block diagram 1100 of an example embodiment of an environment 1100 for the walker 320. An input stream of packets 101a may be received 1102 and may include packets 1116a-f that may be packets from different flows, such as a first flow 1114a and a second flow 1114b. For example, packets P1 1116a, P4 1116d, and P6 1116f may be packets in the first flow 1114a whereas packets P2 1116b, P3 1116c, and P5 1116e may belong to the second flow 1114b. The processing cores 1103 may be general purpose processing cores of the security appliance 102, as disclosed above with reference to FIG. 1, that may be configured to perform higher level protocol processing of the packets 101a and may be configured to offload the pattern matching methods to the HFA 110 and HNA 108.

The packets 101*a* may be forwarded 1104 to the HFA 110 and the walker 320 may walk segments of the packets 101*a* through the unified DFA 312, such as the unified DFA 312 of FIG. 3, to determine partial matches of the regular expression patterns 304 in the input stream. The walker 320 may be configured to forward 1106 results of the partial matches that may identify offsets of segments of the packets 101*a* and nodes of per-pattern NFAs, such as the at least one NFA 314, to progress the partial matches by the HNA 108 that may walk the at least one NFA 314 based on the partial match results of the DFA processing of the HFA 110, as the partial match results may be forwarded 1108 to the HNA 108 with corresponding packets of the packets 101*a*.

As disclosed above, the unified DFA 312 may be generated using subpatterns selected from each regular expression pattern in a set of one or more regular expression patterns. Each partial match result of the DFA processing may be referred to herein as a subpattern search context. As such, each at least one subpattern search context may be generated based on identifying a respective match of a respective subpattern in the flow, by walking segments of the payload through the unified DFA 312.

Each at least one subpattern search context generated for the flow may include a location identifier of a given segment of the segments of the payload. The at least one processor may be configured to advance the search by subsequently walking the given segment at the given node. The given segment may be identified based on the location identifier. Each at least one subpattern search context generated for the flow may include a walk direction for subsequently walking a next segment of the payload at a next node of the given per-pattern NFA. The at least one processor may be configured to advance the search by subsequently walking the next segment at the next node based on a positive match of the given segment at the given node.

The at least one processor may be configured to update the location identifier based on the walk direction and the next segment may be identified based on the location identifier updated. The location identifier may be an offset of the given segment of the payload. The walk direction may be a forward or reverse walk direction. To update the location identifier the at least one processor may be configured to increment the offset based on the forward walk direction or decrement the offset based on the reverse walk direction.

The HNA 108 may enable a determination that partial matches 1118*c*, 1118*b*, and 1118*a*, form a final (i.e., complete) match to a given regular expression pattern of the regular expression patterns 304 in the input stream based on NFA processing performed as a function of subpattern search contexts generated by the DFA processing. For example, by forwarding 1106 the HFA partial match results from the HFA 110 to the HNA 108, either indirectly via the processing cores 1103, or directly 1105 from the HFA 110, each packet partially matched by the HFA 110 may enable the HNA 108 to advance the partial match as the walker 320 may walk segments of the packets 101*a* through the at least one NFA 314, with "hints" or starting information from the HFA 110, that may be included in the subpattern search contexts.

For example, as disclosed above with regard to FIG. 4, the input stack 458 may include at least one job, such as S1 459*a*, S2 459*b*, or S3 459*c*, of the at least one instruction 453, for processing by the HNA 108. The at least one job of the at least one instruction may each belong to a same given payload, such as the payload 462, that was processed by the HFA 110. Such "hints" or starting information that may be based on packet "pre-screening" by the HFA 110 may include NFA starting nodes with corresponding offsets of payload segments for walking with a per-pattern NFA, as disclosed above. As such, the walker 320 may determine final match results 1110 for packets 101*a* that may be forwarded to the processing cores 1103 from the HNA 108 and the packets 101*a* may then be forwarded 1112 as appropriate as the packets 101*b* in the network.

According to embodiments disclosed herein, the at least one instruction 453 may include an input stack pointer (not shown) to the input stack 458, a packet pointer (not shown) to a packet (not shown), and a graph pointer (not shown) to an NFA graph, such as the per-pattern NFA disclosed above, that may be stored in the graph memory 456. The HNA 108 may be configured to load a payload (not shown) in the payload buffer 462 based on the packet pointer. As such, the payload buffer 462 may also be referred to herein as the payload 462.

The HNA 108 may walk segments of the payload 462 through a given per-pattern NFA, such as the NFA 314 that may be an NFA graph, such as the NFA graph 457 that may be pointed to by the graph pointer. The NFA processing by the HNA 108 may include walking (e.g., traversing nodes of the graph to determine whether payload segments match at nodes of the graph) the NFA graph 457 based on context resulting from DFA processing of the payload 462 by the HFA 110 as well as saved context (i.e., historical search context) stored in the save buffer 464 for a given flow associated with the payload 462.

For example, the HNA 108 may have saved context stored from the run time stack 460 to the stack buffer 464. The save context may be historical search context that was previously generated based on DFA processing, NFA processing, or a combination thereof, on a previous payload of a packet, such as the packet P4 1116*d*, that corresponds to a same flow, such as the flow 1114*a*, as a current packet, such as the packet P6 1116*f*, that includes the payload 462 that may be a current payload for processing.

As such, NFA processing of the payload 462 by the HNA 108 may be based on each subpattern search context generated for the current packet P6 1116*f* by the HFA 110 DFA processing and included in the input stack 458 as well as historical search context from the save buffer 464 that may include context saved while processing the payload of the previous packet P4 1116*d* of the flow 1114*a*.

Embodiments disclosed herein may merge the historical search context from the save buffer 464 with each subpattern search context from the input stack 458 in a manner that enables the HNA 108 to resume search processing based on the run stack 460 that includes the historical search context merged. Merging may include linking the context entries in a manner that obviates copying, shifting, or otherwise moving any subpattern search context entries, such as entries stored in the input stack 458, or historical search context entries of the historical search context, such as entries stored in the save buffer 464. Embodiments disclosed herein may enable the HNA 108 to merge the historical search context entries of the save buffer 464 with each subpattern search context entry stored in the input stack 458 based on pointers that may link the input stack 458 with the save buffer 464 and a value of the context entry type field 902 of the subpattern search context entries and the historical search context entries.

Embodiments disclosed herein may enable the HNA 108 to expeditiously proceed to walk one or more per-pattern NFAs with segments from the payload of the current packet P6 1116f in the flow 1114a to advance any partial matches identified based on DFA processing by the HFA 110 and to resume NFA processing that may have been in progress for a payload of the previous packet P4 1116d of the flow 1114a or any other payload of any other previous packet processed for the flow 1114a. It should be understood that packets of a given flow in an input stream may or may not be consecutive packets.

Figure 11B:
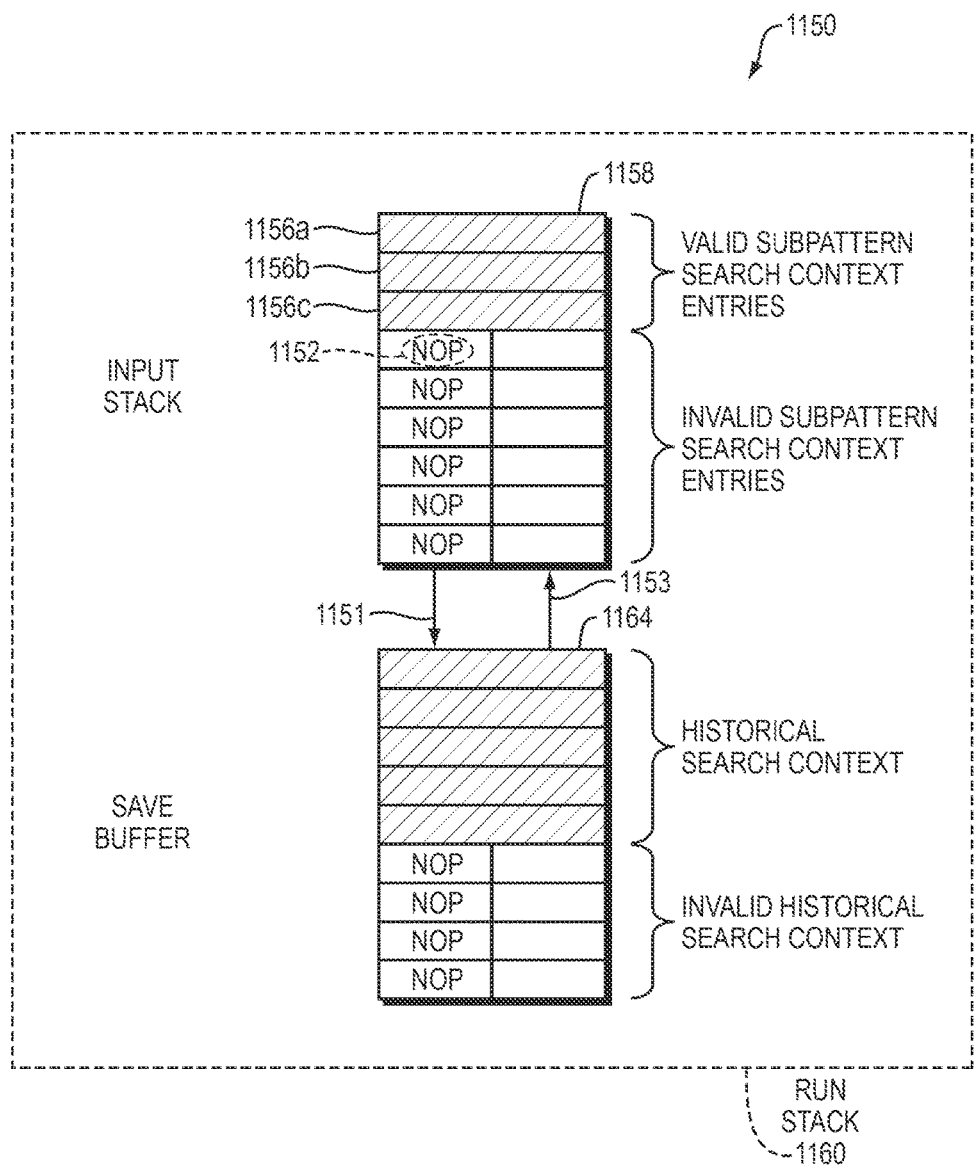
FIG. 11B is a block diagram of an embodiment of an input stack and a save buffer that may be merged as a run stack.

FIG. 11B is a block diagram 1150 of an embodiment of an input stack 1158 including one or more subpattern search context entries and a save buffer 1164 including one or more historical search context entries that may be merged and employed as an initial run stack 1160 for NFA processing of a payload of a packet in a given flow. The input stack 1158 and the save buffer 1164 may each include one or more fixed size buffers, each of the fixed sized buffers may be doubly linked such as via next and previous pointers 1151 and 1153. Each fixed sized buffer may be referred to herein as a chunk that may store a fixed number of stack entries. A number of chunks available for the input stack 1158 and the save buffer 1164 may be finite based on an amount of memory that may be operatively coupled to the HNA 108. According to embodiments disclosed herein, stack entries in each of the chunks that are not pending processing may be considered invalid whereas stack entries that are pending processing may be considered valid.

According to embodiments disclosed herein, the HNA 108 may be configured to determine whether a given stack entry of a chunk is valid or invalid based on a value of the context entry type field, such as the context entry type field 902 as disclosed above with regard to FIG. 9, configured for the given stack entry. Embodiments disclosed herein may configure the context entry type field 902 with a value that indicates "no operation" (i.e., NOP) for the given stack entry after processing the given stack entry, such as by popping the stack entry, or via initialization.

The HNA 108 may process each subpattern search context that is valid, such as the subpattern search context entries 1156a-c generated based on DFA processing by the HFA 110, based on a value of the context entry type field 902 of the subpattern search context entries 1156a-c being different from a NOP value 1152. However, if the HNA 108 determines that a value of the context entry type field 902 for the given stack entry is the NOP value 1152, the HNA 108 may consider the entry invalid and discard or ignore the entry and proceed to a next entry. It should be understood that the NOP value 1152 may be any suitable value for the context entry type field that indicates that the context entry may be ignored.

As such, since context with the context entry type field configured with the NOP value 1152 may be skipped by the HNA 108 and since each chunk is linked to another chunk, the context such as subpattern search context stored in the input stack 1158 and historical search context stored in the save buffer 1164 may be merged by the HNA 108 without allocating memory to copy the valid context of the input stack 1158 and the save buffer 1164 to provide the HNA 108 with contiguous valid entries for processing. It should be understood that distribution and number of valid and invalid context entries as shown in FIG. 11B is for illustrative purposes and that valid and invalid context entries may be distributed contiguously or non-contiguously among one or more chunks of the input stack 1158 or save buffer 1164.

Rather, by linking the chunks with next and previous pointers and by configuring invalid entries with a value in the context type field 902 that is the NOP value 1152, embodiments disclosed herein enable the HNA 108 to combine (i.e., merge) each subpattern search context generated for a packet in a given flow with a historical search context saved for the flow in a manner that obviates any change of location for any of the context entries. By employing the NOP value as a value of the context type field 902 for invalid context entries that may be ignored by the HNA 108, the HNA 108 may be configured to skip such invalid entries enabling valid subpattern search context entries that may be stored in the input stack 1158 to be contiguous or non-contiguous.

Further, according to embodiments disclosed herein, the NOP value for the context type field 902 may be employed to advantageously indicate to the HNA 108 that a given context may be ignored based on determination that a value of the reverse walk direction field 916 is configured such that the context may ignored as it may not be relevant for advancing a partial match in a given packet.

According to embodiments disclosed herein, one or more context entries of a given historical search context, such as one or more save buffer 464 entries resulting from DFA and NFA processing, by the HFA 110 and the HNA 108, respectively, of a first payload of a first packet in a flow, that may have been saved to the save buffer 464 based on detecting an end of the first payload during the NFA processing, may be modified such that the one or more context entries are ignored by the HNA 108 for processing of a second payload of a second packet in the flow. Embodiments disclosed herein may modify the context entry type field 902 of the one or more context entries of the given historical search context with the NOP value 1152 if a directionality of the reverse walk direction field 916 of the one or more context entries is configured such that one or more partial matches corresponding to the one or more context entries would not advance in the second payload due to the directionality configured.

Figure 11C:
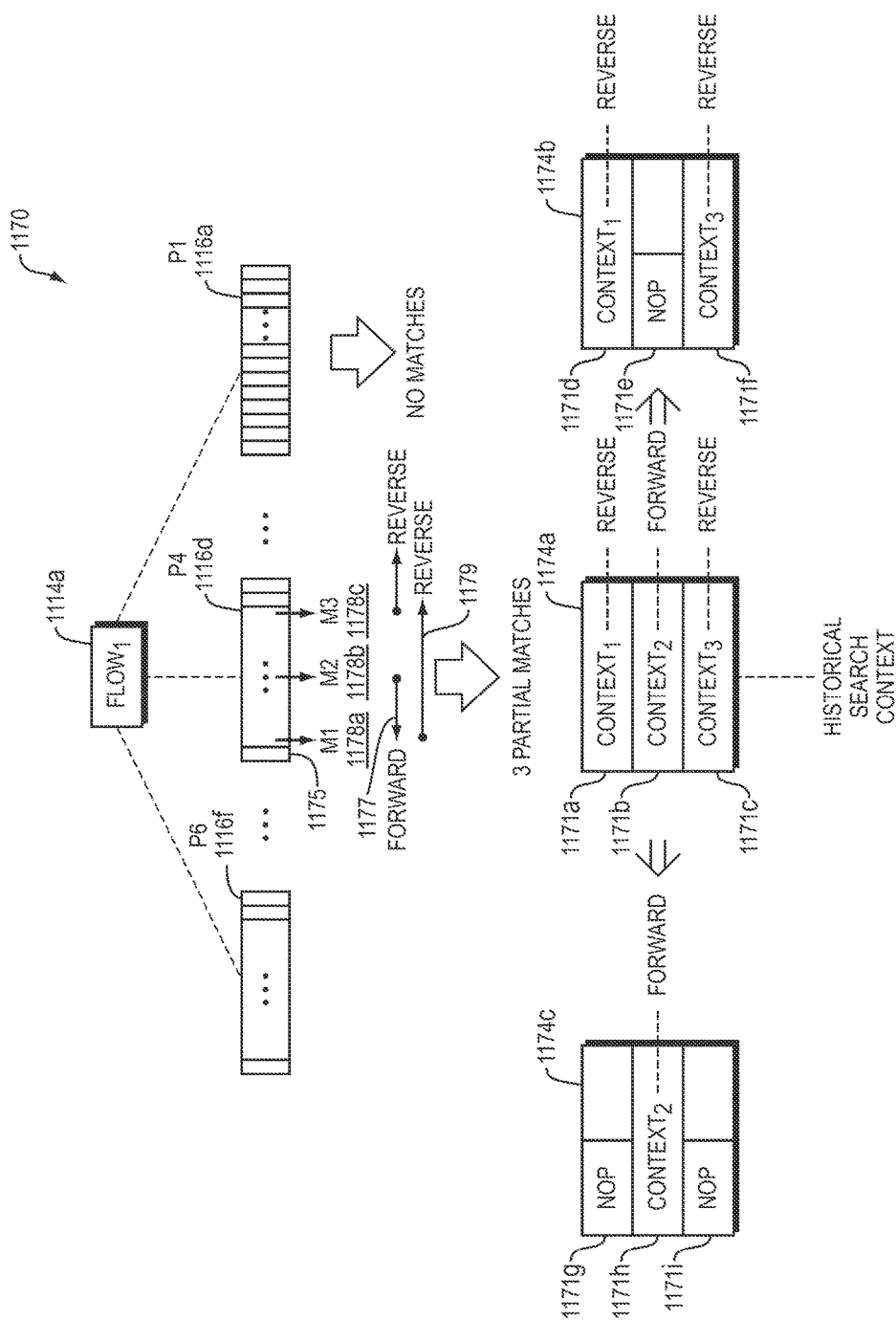
FIG. 11C is a block diagram of an example embodiment of the packets in a flow of FIG. 11A.

FIG. 11C is a block diagram 1170 of an example embodiment of the packets P1 1116a, P4 1116d, and P6 1116f in the flow 1114a of FIG. 11A. In the example embodiment, DFA and NFA processing of the packet P1 1116a resulted in no matches found, either partial or complete. However, the DFA and NFA processing, such as disclosed above with regard to FIG. 11A, of a first payload of a first packet P4 1116d in the flow 1114a, resulted in three partial matches M1 1178a, 1178b, and 1178c, found in the first payload, in the example embodiment. Based on reaching the payload boundary 1175, that may or may not be a last segment of the packet 1116d, the HNA 108 saved content of the run stack 460 to the save buffer 464 producing the historical search context 1174a. It should be understood that a number of packets in a flow, a number of partial matches found in any packet of the flow, and which packets may include partial matches is for illustrative purposes and that any suitable number of packets may be included in a flow, any suitable number of partial matches may be found in any packet of the flow, and any suitable packet may include a partial match.

In the example embodiment, the historical search context 1174a includes three context entries 1171a, 1171b, and 1171c, corresponding to the three partial matches M1 1178a, 1178b, and 1178c. The three context entries 1171a, 1171b, and 1171c may each have a plurality of context fields, such as the plurality of fields disclosed above with regard to FIG. 9. In the example embodiment, a directionality of the reverse walk direction field 916 is configured to indicate a reverse walk direction for the context entries 1171a and 1171c, and is configured to indicate a forward (i.e., not reverse) walk direction for the context entries 1171b.

Because a walk in the forward direction 1177 as specified by the context 1171*b* would not advance a partial match found in the packet P1 1116*a* since the packet 1116*a* was received prior to the packet P4 1116*d*, the historical search context 1174*a* entry 1117*b* may be modified by configuring the context entry type field 902 with the NOP value 1152 and included as the context entry 1171*e* in the historical search context 1174*b* for the packet P1 1116*a*. As such, the historical search context entry 1117*b* may be ignored by the HNA 108 for NFA processing of the packet P1 1116*a* to advance the partial matches found in the packet P4 1116*d*.

In the example embodiment, the historical search context 1174*b* for use in advancing partial matches (found in the packet P4 1116*d*) in the packet P1 1116*a* may include the context entries 1171*d* and 1171*f* that may include context fields configured with the same values as the context entries 1171*a* and 1171*c*, respectively, because partial matches results specifying walking in the reverse direction 1179 may advance based on matching segments from a payload of the packet P1 1116*a*, since the packet P1 1116*a* was received prior to the packet P4 1116*d* for which the historical search context 1174*a* was generated.

Similarly, embodiments disclosed herein may modify the historical search context 1174*a* context entries 1171*a* and 1171*c* and provide the historical search context 1174*c* that includes the context entry 1171*h* with context fields configured with same values as the context entry 1171*b* and the context entries 1171*g* and 1171*i* that may be modified versions of the context entries 1171*a* and 1171*c*, respectively, because partial match results specifying a walk in a forward direction 1177 would be advanced based on matching segments from a payload of the packet P6 1116*f* since the packet P6 1116*f* was received after the packet P4 1116*d* for which the historical search context 1174*a* was generated.

In the example embodiment, the historical search context 1174*c* for use in advancing partial matches (found in the packet P4 1116*d*) in the packet P6 1116*f* may include the context entry 1171*h* that may have context fields configured with values that are the same as the context fields of the context entry 1171*b*, because a partial match result specifying a walk in the forward direction 1177 may advance based on matching segments from a payload of the packet P6 1116*f*, as the packet P6 1116*f* was received after the packet P4 1116*d* for which the historical search context 1174*a* was generated.

Figure 12A:
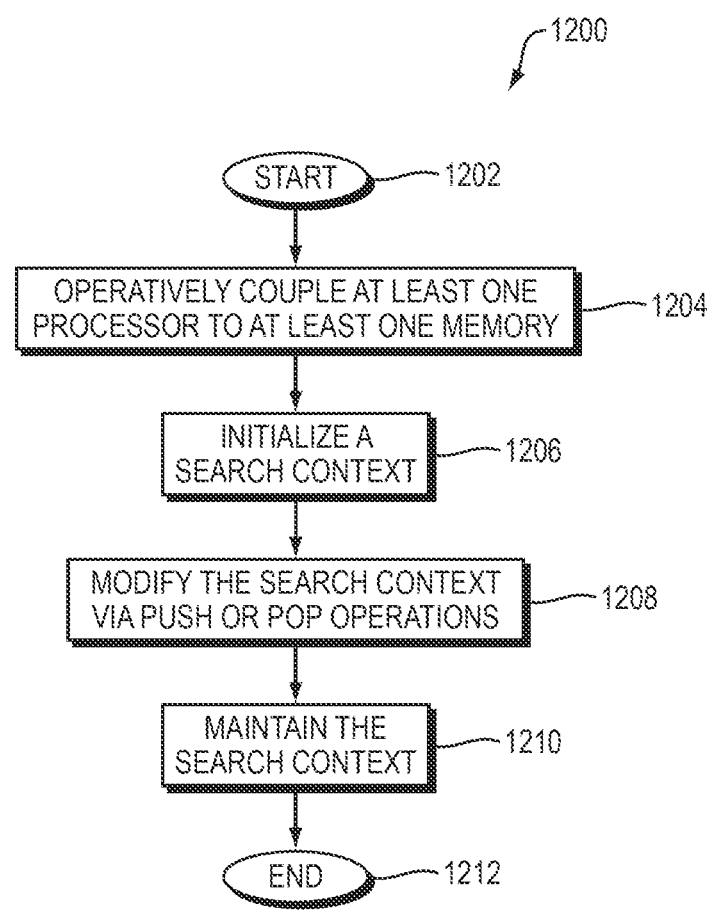
FIG. 12A is a flow diagram of an example embodiment of a method.

FIG. 12A is a flow diagram 1200 of an example embodiment of a method. The method may begin (1202) and operatively couple at least one processor to at least one memory in a security appliance operatively coupled to a network, the least one memory may be configured to store a first finite automaton, at least one second finite automaton, and a run stack (1204). The at least one processor may be configured to search for at least one regular expression pattern in a flow. The method may initialize a search context in the run stack based on (i) partial match results determined from walking segments of a payload of the flow through the first finite automaton and (ii) a historical search context associated with the flow (1206). The method may include modifying the search context via push or pop operations to direct the at least one processor to walk segments of the payload through the at least one second finite automaton to explore whether at least one partial match of at least one regular expression pattern advances along at least one path of the at least one second finite automaton (1208). The method may include maintaining the search context in a manner obviating overflow of the search context and stalling of the push or pop operations (1210) and the method thereafter ends (1212) in the example embodiment.

Figure 12B:
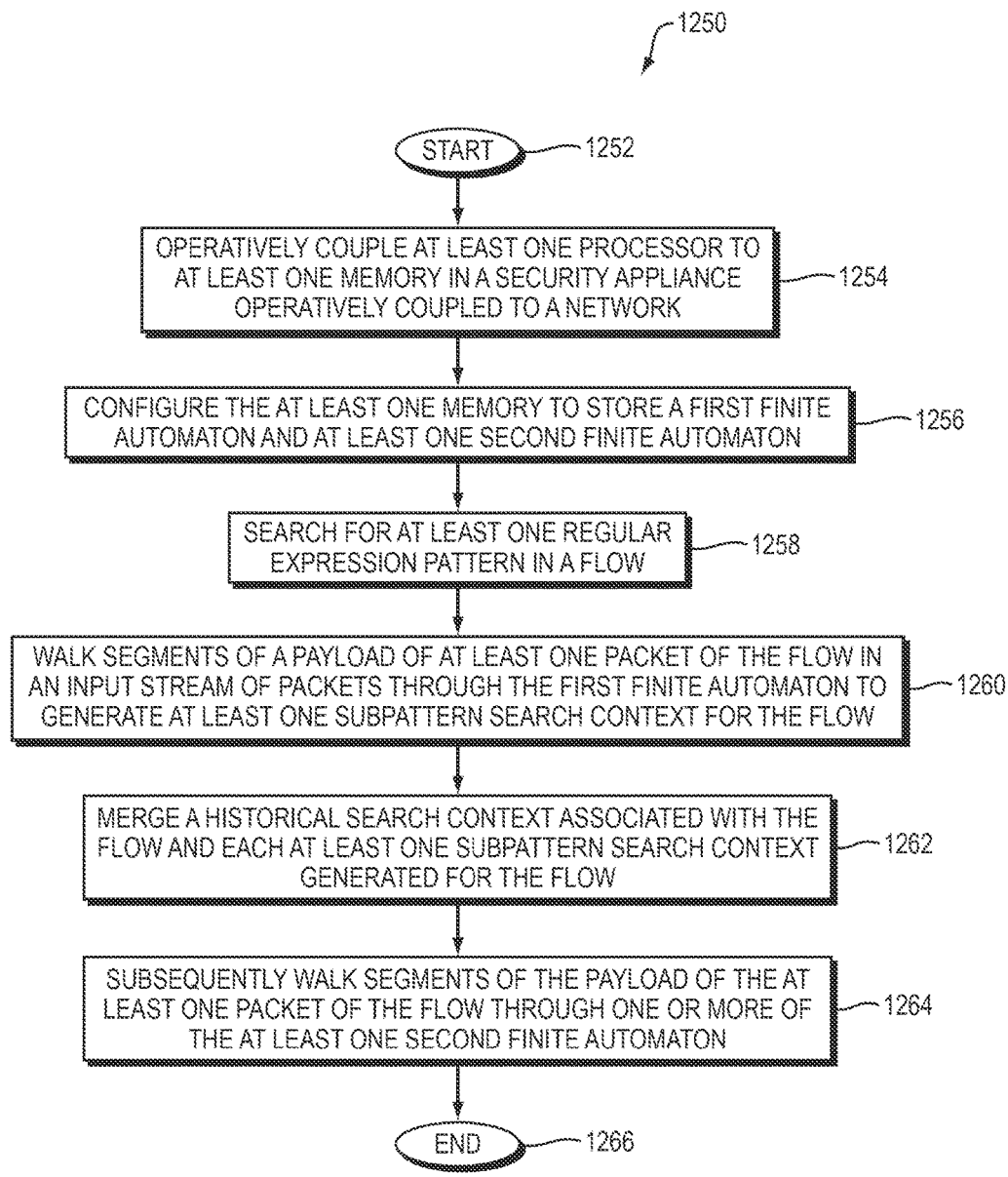
FIG. 12B is a flow diagram of another example embodiment of a method.

FIG. 12B is a flow diagram 1250 of an example embodiment of another method. The method may begin (1252) and operatively couple at least one processor to at least one memory in a security appliance operatively coupled to a network (1254). The least one memory may be configured to store a first finite automaton and at least one second finite automaton (1256). The at least one processor may be configured to search for at least one regular expression pattern in a flow (1258). The search may include walking segments of a payload of at least one packet of the flow in an input stream of packets through the first finite automaton to generate at least one subpattern search context for the flow (1260). The search may include merging a historical search context associated with the flow and each at least one subpattern search context generated for the flow (1262). The search may include subsequently walking segments of the payload of the at least one packet of the flow through one or more of the at least one second finite automaton to advance the search for the at least one regular expression pattern based on the historical search context merged (1264) and the method thereafter ends (1266) in the example embodiment.

Figure 13:
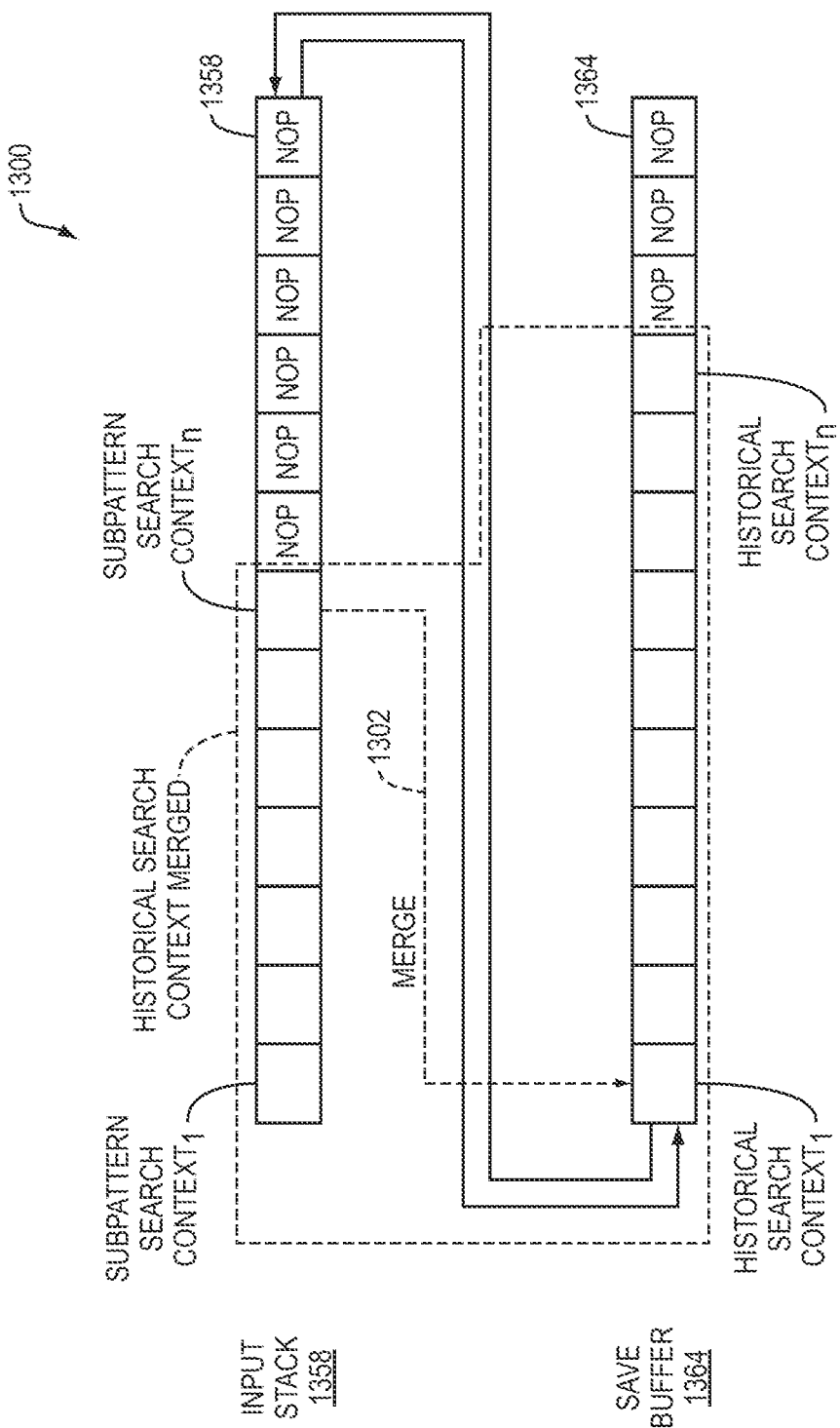
FIG. 13 is a block diagram of an example embodiment of at least one subpattern search context for a flow and a historical search context associated with the flow that may be merged to advance the search for at least one regular expression pattern based on the historical search context merged.

FIG. 13 is a block diagram 1300 of an example embodiment of at least one subpattern search context 1358 for a flow and a historical search context 1364 associated with the flow that may be merged 1302 to advance the search for at least one regular expression pattern based on the historical search context merged 1360. The historical search context 1364 associated with the flow may include one or more context entries saved by the at least one processor in a given memory of the at least one memory to enable the at least one processor to walk a given node of a given second finite automaton of the at least one second finite automaton with a given segment of the segments of the payload. For example, the historical search context 1364 may include one or more stack entries saved to the save buffer 464 of FIG. 4 that may be stack entries previously stored in the run stack 460 of FIG. 4 as disclosed above. The at least one subpattern search context 1358 may include at least one stack entry of the input stack 458 of FIG. 4 that may be populated based on DFA processing as disclosed above. Each of stack entries may include a plurality of fields such as the plurality of fields 901 of FIG. 9. Merging 1302 the historical search context 1364 associated with the flow and each at least one subpattern search context 1358 generated for the flow may obviate copying entries stored in the input stack 1358 and the save buffer 464 to the run stack 460 by linking entries and ignoring entries marked with the NOP indicator as disclosed above.

According to embodiments disclosed herein, the HNA 108 may be configured to process all entries, such as the historical search context merged 1360, in the run stack 460, with the current payload stored in the on-chip payload buffer 462, before discarding content of the payload buffer 462. As such, the HNA 108 may avoid multiple passes of the payload in the payload buffer 462. The payload buffer 462 may be advantageously sized to accommodate a maximum transmission unit (MTU) of a packet received from the network. For example, the payload buffer may be configured to store up to 1536 bytes. Further, because the HNA 108 may be configured to walk the at least one NFA 314 based on the merging 1302 of the historical search context 1364 associated with the flow and each at least one subpattern search context 1358 generated for the flow, the HNA 108 optimizes a search for at least one regular expression pattern that may span multiple packets to determine a complete (i.e., final)

match of the at least one regular expression pattern in the input stream such as shown in FIG. 11A as disclosed above.

Figure 14:
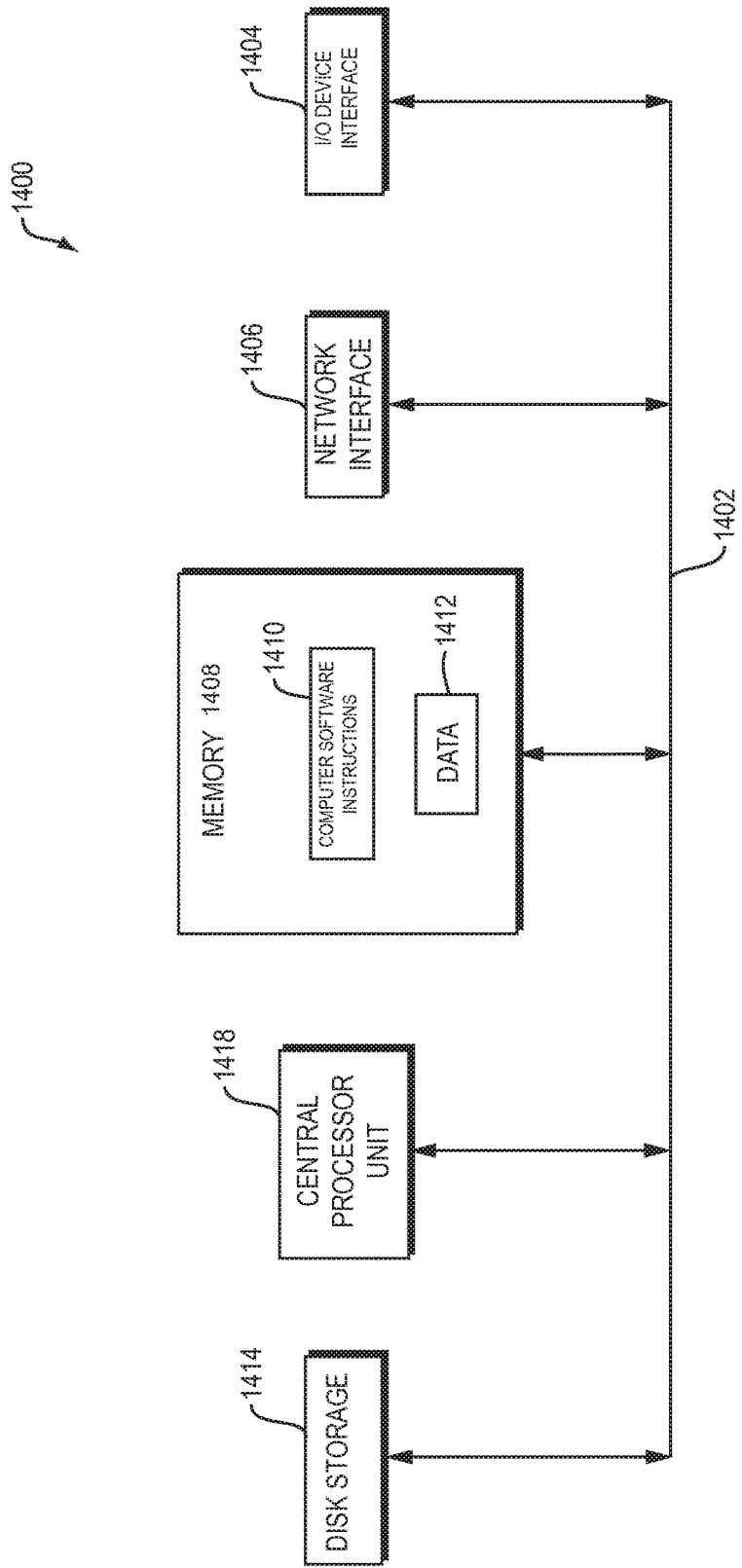
FIG. 14 is a block diagram of an example internal structure of a computer optionally within an embodiment disclosed herein.

FIG. 14 is a block diagram of an example of the internal structure of a computer 1400 in which various embodiments of the present invention may be implemented. The computer 1400 contains a system bus 1402, where a bus is a set of hardware lines used for data transfer among the components of a computer or processing system. The system bus 1402 is essentially a shared conduit that connects different elements of a computer system (e.g., processor, disk storage, memory, input/output ports, network ports, etc.) that enables the transfer of information between the elements. Operative with the system bus 1402 is an I/O device interface 1404 for connecting various input and output devices (e.g., keyboard, mouse, displays, printers, speakers, etc.) to the computer 1400. A network interface 1406 allows the computer 1400 to connect to various other devices attached to a network. Memory 1408 provides volatile storage for computer software instructions 1410 and data 1412 that may be used to implement embodiments of the present invention. Disk storage 1414 provides non-volatile storage for computer software instructions 1410 and data 1412 that may be used to implement embodiments of the present invention. A central processor unit 1418 is also operative with the system bus 1402 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

It should be understood that the term "herein" is transferrable to an application or patent incorporating the teachings presented herein such that the subject matter, definitions, or data carries forward into the application or patent making the incorporation.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A security appliance operatively coupled to a network, the security appliance comprising:
   at least one memory configured to store a first finite automaton, at least one second finite automaton, and a run stack; and
   at least one processor operatively coupled to the at least one memory and configured to search for at least one regular expression pattern in a flow, the search including:
   initializing a search context in the run stack based on (i) partial match results determined from walking segments of a payload of the flow through the first finite automaton and (ii) a historical search context associated with the flow;
   modifying the search context via push or pop operations to direct the at least one processor to walk segments of the payload through the at least one second finite automaton to explore whether at least one partial match of at least one regular expression pattern identified via the first automaton advances along at least one path of the at least one second finite automaton; and
   maintaining the search context in a manner obviating overflow of the search context and obviating stalling of the push or pop operations.

2. The security appliance of claim 1, wherein the search context includes a plurality of search context entries and each search context entry is determined based on a given positive partial match result of the partial match results.

3. The security appliance of claim 1, wherein initializing the search context in the run stack includes:
   generating a respective subpattern search context entry for each partial match of the at least one regular expression pattern identified as matching in the flow based on walking segments of the payload of the flow through the first finite automaton; and
   merging the historical search context and each respective subpattern search context entry in the run stack.

4. The security appliance of claim 3, wherein merging the historical search context and each respective subpattern search context entry in the run stack includes obviating copying of each respective subpattern search context entry and each search context entry of the historical search context.

5. The security appliance of claim 4, wherein obviating copying includes skipping over each respective subpattern search context entry and each search context entry that has a context entry type field configured with a no operation (NOP) type of a plurality of node types.

6. The security appliance of claim 3, wherein merging the historical search context and each respective subpattern search context entry in the run stack includes linking chunks of fixed size buffers via next and previous pointers, each fixed size buffer configured to store a given number of search context entries.

7. The security appliance of claim 3, wherein each at least one second finite automaton is a per-pattern non-deterministic finite automaton (NFA) generated for a respective regular expression pattern and each respective subpattern search context entry includes:
   a node identifier of a given node of a given per-pattern NFA of the at least one second finite automaton, the given per-pattern NFA generated for a given regular expression pattern including a respective subpattern identified as matching in the flow;
   a location identifier of a given segment of the segments of the payload, the at least one processor further configured to advance the search by subsequently walking the given segment at the given node, the given segment identified based on the location identifier; and a walk direction for subsequently walking a next segment of the payload at a next node of the given per-pattern NFA, the at least one processor further configured to explore whether a given partial match advances along at least one path by subsequently walking the next segment at the next node based on a positive match of the given segment at the given node.

8. The security appliance of claim 1, wherein the at least one memory further includes a save buffer and the historical search context includes one or more search context entries from a previous search context associated with the flow and saved from the run stack to the save buffer.

9. The security appliance of claim 8, wherein the payload is a current payload and the previous search context was saved from the run stack to the save buffer based on detection of a payload boundary of a previous payload of the flow during walking of segments of the previous payload through the at least one second finite automaton.

10. The security appliance of claim 1, wherein the payload is a current payload and the historical search context includes at least one search context entry configured to enable the at least one processor to walk a given node of a given second finite automaton of the at least one second finite automaton with a given segment of the current payload and wherein the historical search context was created based on detection of a payload boundary during NFA processing of a previous payload in the flow.

11. The security appliance of claim 1, wherein the search context includes at least one search context entry that includes a plurality of fields and the plurality of fields includes:

a context entry type field that is based on a node type, of a plurality of node types, of the given node, the context entry type field signifying which fields, of the plurality of fields, are relevant for the node type;

a match type field that is relevant based on the context entry type field, the match type field being based on the node type and used to determine whether the given node is configured to match a single instance or multiple consecutive instances of a given element in an input stream received from the network;

an element field that is relevant regardless of the context entry type field and identifies the given element for matching at the given node;

a next node address field that is relevant regardless of the context entry type field and identifies a next node;

a count field that is relevant based on the context entry type field and identifies a count value, indicating a number of consecutive instances remaining for positively matching to the given element or having been positively matched to the given element, at the given node, based on the context entry type field;

a discard unexplored context (DUP) field that is relevant regardless of the context entry type field and identifies whether to discard the context entry or walk the next node based on the context, in an event a complete match of at least one regular expression is detected in the input stream;

a reverse walk direction field that is relevant regardless of the context entry type field and identifies a reverse or forward direction of walking; and an offset field that is relevant regardless of the context entry type field and identifies an offset of a segment of a given payload of the flow in the input stream for matching to the given element at the given node or to a next element at the next node, based on the context entry type field, the next element identified via metadata associated with the next node.

12. The security appliance of claim 1, wherein the at least one memory further includes a save buffer and the search further includes saving the search context from the run stack to the save buffer based on detecting a payload boundary of the payload during the walk of segments of the payload through the at least one second finite automaton, the search context saved to the save buffer in association with the flow to enable the at least one processor to employ the saved search context as the historical search context for directing the at least one processor to walk a previous or subsequent payload of the flow through the at least one second finite automata.

13. The security appliance of claim 1, wherein obviating overflow of the search context and obviating stalling of the push or pop operations includes maintaining the search context by employing an internal circular buffer and an external circular buffer and the run stack has a Last-In-First-Out (LIFO) characteristic.

14. The security appliance of claim 13, wherein maintaining the search context includes maintaining entries of the external circular buffer as a doubly linked list of chunks of fixed size buffers each configured to store a given number of search context entries.

15. The security appliance of claim 13, wherein maintaining the search context includes maintaining a first portion of the search context from the run stack in the internal circular buffer and a second portion of the search context from the run stack in the external circular buffer.

16. The security appliance of claim 13, wherein the search further includes transferring search context entries between the internal and external circular buffers in a manner that prevents (i) overflow of the internal circular buffer, (ii) a combination of an empty state of the internal circular buffer and a non-empty state of the external circular buffer to obviate stalling of the pop operation, and (iii) a full state of the internal circular buffer by maintaining a given number of empty search context entries to obviate stalling of the push operation.

17. The security appliance of claim 13, wherein the search further includes transferring context entries between the internal and external circular buffers as a function of low and high watermarks associated with the internal circular buffer.

18. The security appliance of claim 17, wherein the search further includes:

transferring context entries from the internal circular buffer to the external circular buffer based on a total number of context entries stored in the internal circular buffer relative to the high watermark; and transferring context entries from the external circular buffer to the internal circular buffer based on the total number of context entries stored in an on-chip buffer relative to the low watermark, wherein each transfer is a direct memory access (DMA) transfer.

19. The security appliance of claim 1, further comprising at least one network interface, wherein the payload is in an input stream received via the at least one network interface, the input stream including multiple packets with payloads of the flow that are consecutive or non-consecutive packets in the input stream.

20. A method comprising:

operatively coupling at least one processor to at least one memory in a security appliance operatively coupled to a network, the least one memory configured to store a first finite automaton, at least one second finite automaton, and a run stack, the at least one processor configured to search for at least one regular expression pattern in a flow, the search including:
- initializing a search context in the run stack based on (i) partial match results determined from walking segments of a payload of the flow through the first finite automaton and (ii) a historical search context associated with the flow;
- modifying the search context via push or pop operations to direct the at least one processor to walk segments of the payload through the at least one second finite automaton to explore whether at least one partial match of at least one regular expression pattern identified via the first automaton advances along at least one path of the at least one second finite automaton; and
- maintaining the search context in a manner obviating overflow of the search context and obviating stalling of the push or pop operations.

21. The method of claim 20, wherein the search context includes a plurality of search context entries and each search context entry is determined based on a given positive partial match result of the partial match results.

22. The method of claim 20, wherein initializing the search context in the run stack includes:
- generating a respective subpattern search context entry for each partial match of the at least one regular expression pattern identified as matching in the flow based on walking segments of the payload of the flow through the first finite automaton; and
- merging the historical search context and each respective subpattern search context entry in the run stack.

23. The method of claim 22, wherein merging the historical search context and each respective subpattern search context entry in the run stack includes obviating copying of each respective subpattern search context entry and each search context entry of the historical search context.

24. The method of claim 23, wherein obviating copying includes skipping over each respective subpattern search context entry and each search context entry that has a context entry type field configured with a no operation (NOP) type of a plurality of node types.

25. The method of claim 22, wherein merging the historical search context and each respective subpattern search context entry in the run stack includes linking chunks of fixed size buffers via next and previous pointers, each fixed size buffer configured to store a given number of search context entries.

26. The method of claim 22, wherein each at least one second finite automaton is a per-pattern non-deterministic finite automaton (NFA) generated for a respective regular expression pattern and each respective subpattern search context entry includes:
- a node identifier of a given node of a given per-pattern NFA of the at least one second finite automaton, the given per-pattern NFA generated for a given regular expression pattern including a respective subpattern identified as matching in the flow;
- a location identifier of a given segment of the segments of the payload, the at least one processor further configured to advance the search by subsequently walking the given segment at the given node, the given segment identified based on the location identifier; and
- a walk direction for subsequently walking a next segment of the payload at a next node of the given per-pattern NFA, the at least one processor further configured to explore whether a given partial match advances along at least one path by subsequently walking the next segment at the next node based on a positive match of the given segment at the given node.

27. The method of claim 20, wherein the at least one memory further includes a save buffer and the historical search context includes one or more search context entries from a previous search context associated with the flow and saved from the run stack to the save buffer.

28. The method of claim 27, wherein the payload is a current payload and the previous search context was saved from the run stack to the save buffer based on detection of a payload boundary of a previous payload of the flow during walking of segments of the previous payload through the at least one second finite automaton.

29. The method of claim 20, wherein the payload is a current payload and the historical search context includes at least one search context entry configured to enable the at least one processor to walk a given node of a given second finite automaton of the at least one second finite automaton with a given segment of the current payload and wherein the historical search context was created based on detection of a payload boundary during NFA processing of a previous payload in the flow.

30. The method of claim 20, wherein the search context includes at least one search context entry that includes a plurality of fields and the plurality of fields includes:
- a context entry type field that is based on a node type, of a plurality of node types, of the given node, the context entry type field signifying which fields, of the plurality of fields, are relevant for the node type;
- a match type field that is relevant based on the context entry type field, the match type field being based on the node type and used to determine whether the given node is configured to match a single instance or multiple consecutive instances of a given element in an input stream received from the network;
- an element field that is relevant regardless of the context entry type field and identifies the given element for matching at the given node;
- a next node address field that is relevant regardless of the context entry type field and identifies a next node;
- a count field that is relevant based on the context entry type field and identifies a count value, indicating a number of consecutive instances remaining for positively matching to the given element or having been positively matched to the given element, at the given node, based on the context entry type field;
- a discard unexplored context (DUP) field that is relevant regardless of the context entry type field and identifies whether to discard the context entry or walk the next node based on the context, in an event a complete match of at least one regular expression is detected in the input stream;
- a reverse walk direction field that is relevant regardless of the context entry type field and identifies a reverse or forward direction of walking; and
- an offset field that is relevant regardless of the context entry type field and identifies an offset of a segment of a given payload of the flow in the input stream for matching to the given element at the given node or to a next element at the next node, based on the context entry type field, the next element identified via metadata associated with the next node.

31. The method of claim 20, wherein the at least one memory further includes a save buffer and the search further includes saving the search context from the run stack to the save buffer based on detecting a payload boundary of the payload during the walk of segments of the payload through the at least one second finite automaton, the search context saved to the save buffer in association with the flow to enable the at least one processor to employ the saved search context as the historical search context for directing the at least one processor to walk a previous or subsequent payload of the flow through the at least one second finite automata.

32. The method of claim 20, wherein obviating overflow of the search context and obviating stalling of the push or pop operations includes maintaining the search context by employing an internal circular buffer and an external circular buffer and the run stack has a Last-In-First-Out (LIFO) characteristic.

33. The method of claim 32, wherein maintaining the search context includes maintaining entries of the external circular buffer as a doubly linked list of chunks of fixed size buffers each configured to store a given number of search context entries.

34. The method of claim 32, wherein maintaining the search context includes maintaining a first portion of the search context from the run stack in the internal circular buffer and a second portion of the search context from the run stack in the external circular buffer.

35. The method of claim 32, wherein the search further includes transferring search context entries between the internal and external circular buffers in a manner that prevents (i) overflow of the internal circular buffer, (ii) a combination of an empty state of the internal circular buffer and a non-empty state of the external circular buffer to obviate stalling of the pop operation, and (iii) a full state of the internal circular buffer by maintaining a given number of empty search context entries to obviate stalling of the push operation.

36. The method of claim 32, wherein the search further includes transferring context entries between the internal and external circular buffers as a function of low and high watermarks associated with the internal circular buffer.

37. The method of claim 36, wherein the search further includes:
transferring context entries from the internal circular buffer to the external circular buffer based on a total number of context entries stored in the internal circular buffer relative to the high watermark; and
transferring context entries from the external circular buffer to the internal circular buffer based on the total number of context entries stored in an on-chip buffer relative to the low watermark, wherein each transfer is a direct memory access (DMA) transfer.

38. The method of claim 20, further comprising at least one network interface, wherein the payload is in an input stream received via the at least one network interface, the input stream including multiple packets with payloads of the flow that are consecutive or non-consecutive packets in the input stream.

39. A non-transitory computer-readable medium having stored thereon a sequence of instructions which, when loaded and executed by a processor, causes the processor to:
initialize a search context in the run stack based on (i) partial match results determined from walking segments of a payload of the flow through a first finite automaton and (ii) a historical search context associated with the flow;
modify the search context via push or pop operations to direct the at least one processor to walk segments of the payload through the at least one second finite automaton to explore whether at least one partial match of at least one regular expression pattern identified via the first automaton advances along at least one path of the at least one second finite automaton; and
maintain the search context in a manner obviating overflow of the search context and obviating stalling of the push or pop operations.

* * * * *